(12) United States Patent
Balasubramanian et al.

(10) Patent No.: US 8,833,603 B1
(45) Date of Patent: Sep. 16, 2014

(54) APPARATUS FOR COUNTING AND DISPENSING PILLS WITH A VIBRATING PLATE

(71) Applicant: Innovation Associates, Inc., Johnson City, NY (US)

(72) Inventors: Prashanth Balasubramanian, Vestal, NY (US); Joseph H. Boyer, Johnson City, NY (US); James Boyer, Endicott, NY (US); Mark Jones, New Milford, PA (US); Christopher Mayes, Vestal, NY (US); George Plesko, Chadds Ford, PA (US); Edwin T. V. Quigley, Endicott, NY (US); Joseph Scott, Vestal, NY (US); Joseph Sienko, Apalachin, NY (US); James Worthington, Binghamton, NY (US); Alban Yee, Astoria, NY (US)

(73) Assignee: Innovation Associates, Inc., Johnson City, NY (US)

( * ) Notice: Subject to any disclaimer, the term of this patent is extended or adjusted under 35 U.S.C. 154(b) by 0 days.

(21) Appl. No.: 13/853,201

(22) Filed: Mar. 29, 2013

(51) Int. Cl.
  *B65H 3/26* (2006.01)
  *A61J 7/02* (2006.01)
  *B65D 83/04* (2006.01)
  *G07F 17/00* (2006.01)

(52) U.S. Cl.
  CPC . *A61J 7/02* (2013.01); *B65D 83/04* (2013.01); *G07F 17/0092* (2013.01)
  USPC .......................................... 221/204; 221/200

(58) Field of Classification Search
  CPC ....... G07F 17/0092; A61J 7/0084; A61J 7/02; A61J 1/03; A61J 7/0076; A61J 7/04
  USPC .................................................. 221/200, 203
  See application file for complete search history.

(56) References Cited

U.S. PATENT DOCUMENTS

| | | | |
|---|---|---|---|
| 3,954,169 A | 5/1976 | Clark | |
| 5,213,232 A * | 5/1993 | Kraft et al. | 221/277 |
| 5,638,417 A | 6/1997 | Boyer et al. | |
| 5,884,806 A * | 3/1999 | Boyer et al. | 221/75 |
| 6,592,005 B1 | 7/2003 | Coughlin et al. | |
| 6,805,259 B2 | 10/2004 | Stevens et al. | |
| 7,210,598 B2 | 5/2007 | Gerold et al. | |
| 7,571,023 B2 | 8/2009 | Mitchell et al. | |
| 7,624,894 B2 | 12/2009 | Gerold et al. | |
| 7,853,355 B1 * | 12/2010 | Willemse et al. | 700/243 |
| 8,020,724 B2 | 9/2011 | Remis et al. | |
| 8,066,150 B2 * | 11/2011 | Clarke et al. | 221/198 |
| 8,141,330 B2 | 3/2012 | Henkel | |
| 8,271,128 B1 | 9/2012 | Schultz | |
| 8,348,094 B2 | 1/2013 | Remis et al. | |
| 8,393,495 B2 * | 3/2013 | Kim | 221/200 |

\* cited by examiner

*Primary Examiner* — Timothy Waggoner
(74) *Attorney, Agent, or Firm* — Mark Levy; Hinman, Howard & Kattell, LLP

(57) ABSTRACT

A self-contained pill dispenser is disclosed. A housing is provided and a hopper for containing a plurality of pills is supported by the housing. A feed chute having a transport spiral therein is operatively connected to the hopper for receiving pills therefrom. The transport spiral has an outlet and controllable aperture. A vibrating plate is disposed proximate the outlet. A drive mechanism is connected to the vibrating plate for imparting vibration thereto. The drive mechanism can abruptly stop the vibration of the vibrating plate. A microcontroller is also operatively connected to the hopper, the transport spiral, and the drive mechanism. The system can self-calibrate the mechanism for counting and dispensing pills.

18 Claims, 26 Drawing Sheets

Pill Dispenser 300

Feed Chute Assembly

V-Plate Assembly

APPARATUS FOR COUNTING AND DISPENSING PILLS WITH A VIBRATING PLATE

RELATED PATENT APPLICATIONS

The present patent application is related to co-pending applications for U.S. patent application Ser. No. 13/853,230 for PILL COUNTING AND DISPENSING APPARATUS WITH SELF-CALIBRATING DISPENSER; Ser. No. 13/853,236 for APERTURE POSITION CONTROL FOR PILL COUNTING AND DISPENSING APPARATUS; Ser. No. 13/853,260 for APPARATUS FOR COUNTING AND DISPENSING PILLS USING PILL VOLUME CALCULATIONS; and Ser. No. 13/853,269 for APPARATUS FOR COUNTING AND DISPENSING PILLS USING MULTI-STAGED PILL SINGULATION, all filed concurrently herewith.

FIELD OF THE INVENTION

The present invention pertains to devices that automatically count and dispense pills and more particularly, to an automated dispensing and prepackaging system featuring a standard module capable of handling a complete range of prescription or pharmacological pill sizes and shapes.

BACKGROUND OF THE INVENTION

Pill dispensing often requires numerous different mechanisms that are designed to recognize, sort and count pills, capsules and tablets of many different sizes, shapes and material properties. (For purposes of simplicity in this document a capsule, gelcap, tablet or the like is referred to as a "pill.") In order for a pill dispenser to properly recognize and accurately count many different kinds of pills, it has often been necessary to modify, or even have different dispenser designs that are specifically dedicated to accommodate different kinds of pills. Often, adjustments must be made to a particular device during its operation. Such changes greatly inhibit the use of such devices in facilities that are automated or continuously run. Many of these devices are problematical, due to their lack of reliability, especially with respect to counting accuracy.

U.S. Pat. No. 5,884,806 issued Mar. 23, 1999 by Boyer, et al. and assigned to the present assignee, for DEVICE THAT COUNTS AND DISPENSES PILLS, describes a mechanism that helps overcome many of the aforementioned problems. The pill-dispensing system has a number of standardized, or universal-type, modules. Each module has a rotating, helix-drive mechanism, which is rotationally controlled by a microprocessor. The helical-drive mechanism features several improvements, both in the drive mechanism and in the software control of the rotational drive system by the microprocessor that allows for the dispensing of pills of all shapes and sizes one at a time. The helix of the drive is securely mounted within a rotatable, hollow tube. A stationary collar is mounted adjacent the upper end of the rotating tube. The rotating helix extends into the stationary collar and forces pills from the hollow tube to the dispensing edge of the stationary collar. A hopper positioned at the input end, or mouth of the tube, feeds a batch quantity of pills to the drive mechanism. The tube is angled upwardly from the mouth portion, so that the pill-dispensing end is positioned above the input end. In this fashion, the pills that are fed through the tube move upwardly against gravity.

The utilization of pill dispensing machines has greatly increased since the aforementioned patent application was filed, as have the quantities and different types of pills that must be automatically dispensed on a daily basis. Furthermore, prescriptions for pills that are filled by mail order have become more prevalent, increasing the need for accurate pill counting and dispensing equipment.

In order to maintain function and accurate count reliability, the maintenance necessary to keep the many dispensing devices has increased. For example, in certain high volume dispensing operations where pills are dispensed in large numbers, pill dust buildup due to electro-static charge accumulation requires more frequent cleaning of the dispensers. Under conditions of low humidity, dust buildup for many pills is exacerbated. Pill dust buildup on optical sensors can eventually lead to unreliable pill count accuracy. Pill dust also can cause machinery to clog and parts to wear out prematurely due to friction. Therefore, maintenance and cleaning necessary to assure accurate pill count and equipment life is an economically important consideration for high volume pill dispensing.

U.S. Pat. No. 6,592,005, issued to Coughlin, et al. on Jul. 15, 2003 for PILL COUNT SENSOR FOR AUTOMATIC MEDICAMENT DISPENSING MACHINE, discloses a pill count sensor comprising an electromagnetic energy emitting array and an electromagnetic energy receiving array, with a pill detection zone defined therebetween; a sensor amplifier; a control board interfaced with a computing device; and interconnecting cabling. The electromagnetic energy emitting and receiving arrays emit and receive, respectively, beams of electromagnetic energy across the zone such that any pill entering the zone is detected by a resulting disruption in received electromagnetic energy at the receiving array. A sensor amplifier is operable to automatically self-calibrate in order to compensate for detected electromagnetic energy levels, and to generate a pill sense signal in response to a detected pill. A control board increments a pill count.

U.S. Pat. Nos. 8,348,094 and 8,020,724, issued to Remis, et al. on Jan. 8, 2013 and Sep. 20, 2011, respectively, for VACUUM BASED PILL SINGULATOR AND COUNTER BASED THEREON, disclose a singulating disc, carried by a housing, having a plurality of openings around its periphery. The disc rotates vertically through a pickup chamber of a hopper carried by the housing. A vacuum is pulled through the openings by a pump which is connected to the disc. Items are placed in the hopper and, via gravity, fall to the bottom of the hopper where they contact the periphery of the rotating disc. The vacuum at the openings attaches an item and holds it while the disc rotates. At the top of the discs rotation, a diverter directs the item into a path depending on the results of fragment detection and/or counting mechanism. Items that are allowed to pass by the diverter are scraped off the disc into another path by a scraper. Negative pressure is used to singulate and count a multitude of sizes and shapes of items with no calibration. Retractable paddles, a vacuum management system, and RFID tags may be incorporated. The paddles aid in the pickup and agitation of the items while the vacuum management system conserves the vacuum capacity necessary to pickup and singulate items. The RFID tags may contain information such as the number of items left in the hopper, a par level for that item, and an expiration date, among others.

U.S. Pat. No. 8,271,128, issued to Schultz on Sep. 18, 2012 for PHARMACY WORKFLOW MANAGEMENT SYSTEM INCLUDING PLURAL COUNTERS, discloses a pharmacy workflow management system including plural counters and a pharmacy workflow management method. The system includes a housing, a first automatic object counter, and a cassette dispenser which feeds objects from a cassette mounted thereto to the first object counter. A second object counter counts objects fed from a cassette mounted to the cassette dispenser. A data processing platform within the housing is programmed with instructions that enable the system to compare the counts from the first and second object counters. The data processing platform also provides for management of pharmacy workflow by providing control of prescription fulfillment.

U.S. Pat. No. 8,141,330 issued to Henkel on Mar. 27, 2012 for SYSTEMS AND METHODS OF AUTOMATED TABLET DISPENSING, PRESCRIPTION FILLING, AND PACKAGING, discloses a system and method of automatically dispensing tablets. The system includes an automatic dispensing tablet dispensing system and provides a means of lowering errors while preventing unauthorized tampering by non-authorized personnel. Moreover, the invention relates to systems and methods for packaging vials, packaging items from totes, and packaging items from totes with vials.

U.S. Pat. Nos. 7,624,894 and 7,210,598 issued to Gerold, et al. on Dec. 1, 2009 and May 1, 2007, respectively, for AUTOMATED PILL-DISPENSING APPARATUS, disclose a pill-dispensing apparatus for automatically dispensing solid pills that includes a plurality of storage units and a pill dispensing module. The storage units store pills in bulk and each include a hopper and an auger movably positioned with respect to the hopper. An inlet of the auger is positioned to receive pills from the hopper. The pill-dispensing module includes: a dock for receiving and holding a selected one of the storage units, a drive unit for rotating the auger to motivate the pills along the auger, a pill counter for counting pills dispensed from an auger outlet, and a lift for tilting the hopper to control flow and to assist in motivating pills to fall from the hopper and move along the auger.

U.S. Pat. No. 7,571,023, issued to Mitchell, et al. on Aug. 4, 2009 for PHARMACEUTICAL SINGULATION COUNTING AND DISPENSING SYSTEM, discloses an apparatus for counting pharmaceutical units having a supporting deck assembly, a hopper, a cylindrical chamber and a transport ring positioned between the hopper and the cylindrical chamber. The hopper has a tilted floor, which can be shaken or vibrated to discharge the units on to a transport ring, and the transport ring is sloped downward from its inner to outer perimeter, which brings the units into contact with the undulating surface of the walls of the cylindrical chamber to promote singulation prior to counting.

U.S. Pat. No. 6,805,259, issued to Stevens, et al. on Oct. 19, 2004 for MEDICATION DISPENSER, discloses a medication tablet dispenser with an upright casing providing a tower which is subdivided by horizontal partitions into eight compartments which individually contain removable holders each containing a charge of tablets to be dispensed. The holders have framing portions which together provide a funnel opening downwardly into a cavity of a blister sheet. The casing is vibrated back and forth about its vertical axis through a small angle to cause tablets in the holders to progress towards an outlet leading into the funnel and having an associated ejector which discharges selected tablets into the funnel when required by a computer program. Conical vibration of the casing is prevented by a connection located on its vertical axis and held stationary by a fixed arm. The ejectors operate in response to slide-rods individually reciprocated by associated solenoids controlled by the computer program.

U.S. Pat. Nos. 6,592,005 and 5,638,417, issued to Boyer, et al. on Sep. 23, 1997 and Jun. 10, 1997, respectively, and assigned to the present assignee for METHOD FOR COUNTING AND DISPENSING TABLETS, CAPSULES, AND PILLS and SYSTEM FOR PILL AND CAPSULE COUNTING AND DISPENSING, respectively, disclose a method and apparatus for counting and dispensing pills, tablets, and capsules which depends on a simple vibrating, sloped, concave-shaped (e.g., V-shaped) trough, having a number of descending steps. The vibration of the trough is controlled and adjusted by a microprocessor. The vibration of the trough is patterned to provide greater vibratory amplitude at its dispensing end than at its intake end. The difference at each end of the trough in vibratory amplitude is achieved by elastomeric supports that are differently spring dampened. The microprocessor electronically adjusts the input vibration to the trough, such that the flow of materials is adjusted for different types of materials (i.e., tablets of different shapes and/or sizes). This causes the tablets to align accurately within the trough, and sequentially pass a pill detector mechanism in single file. This ensures that the device can handle an extremely varied range of tablet or capsule sizes and shapes.

U.S. Pat. No. 3,954,169, issued to Clark on May 4, 1976 for VIBRATING FEEDER DEVICE, discloses an electromagnetic feeder device operable for creating controlled vibration. The electromagnetic feeder device includes means for permitting both the frequency of vibration to be tuned and the armature gap setting to be adjusted while the device is operating. The electromagnetic feeder device has an electromagnet coil supported on a coil mounting plate. In turn, the coil mounting plate is supported on a base angle plate which itself is supported on a base angle whereby the vibrating firing angle of the electromagnetic feeder device may be adjusted, i.e., the device may be made to vibrate left or right.

What is needed is an improved pill dispenser that is more reliable and addresses problems such as parts wear and dust buildup over time. The dispenser should be able to handle an ever increasing variety of sizes, shapes and material properties of pills with extremely high count reliably while requiring less maintenance, calibration, or modification compared with previous designs.

SUMMARY OF THE INVENTION

In accordance with the invention, there is provided a device for counting and dispensing pills. A hopper for containing a plurality of pills is supported by a housing. A feed chute is operatively connected to the hopper for receiving pills therefrom. The feed chute has an outlet and a vibrating plate is disposed proximate the outlet. A drive mechanism is connected to the vibrating plate for imparting vibration thereto. The drive mechanism has a mechanism for abruptly stopping the vibration of the vibrating plate. A microcontroller is also operatively connected to the feed chute and the drive mechanism.

The pill counter and dispenser effectively addresses problems of pill dust buildup by the use electrically conductive parts, especially conductive plastics to ground out and thereby neutralize or dissipate unwanted electrostatic charge and prevent dust accumulation on optical sensors. Multiple singulation stages are also incorporated to separate pills so they can be counted with unprecedented levels of accuracy. Moreover, the combinations of static charge reduction, low friction material selection, conductive material selection, multiple singulation stages, and pill conveyance techniques attain great counting accuracy and actually convey pill dust out of the dispenser, thereby greatly reducing cleaning maintenance. Materials for critical parts have also been selected to eliminate stray light on optical sensors and to reduce parts wear due to friction. The system can calibrate itself over time to accommodate inevitable wear and change as well as changes in the environmental conditions.

BRIEF DESCRIPTION OF THE DRAWINGS

A complete understanding of the present invention may be obtained by reference to the accompanying drawings, when considered in conjunction with the subsequent, detailed description, in which:

FIG. 9b is another perspective view of the detector chute shown in FIG. 9a;

FIG. 10b is another perspective view of the vibratory feed chute shown in FIG. 10a;

FIG. 11b is another perspective view of the inlet aperture control system shown in FIG. 11a;

FIG. 12b is another perspective view of the belt-driven helical spiral drive shown in FIG. 12a;

FIG. 13b is a perspective interior view of the V-plate shown in FIGS. 7 and 13a;

DETAILED DESCRIPTION OF THE INVENTION

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

A housing is provided and a hopper for containing a plurality of pills is supported by the housing. A feed chute receives pills therefrom. The feed chute has an outlet and a vibrating plate is disposed proximate the outlet. A drive mechanism is connected to the vibrating plate for imparting vibration thereto. The drive mechanism has a mechanism for abruptly stopping the vibration of the vibrating plate. A microcontroller is also operatively connected to the feed chute and the drive mechanism.

Loading the Dispenser

Figure 1:
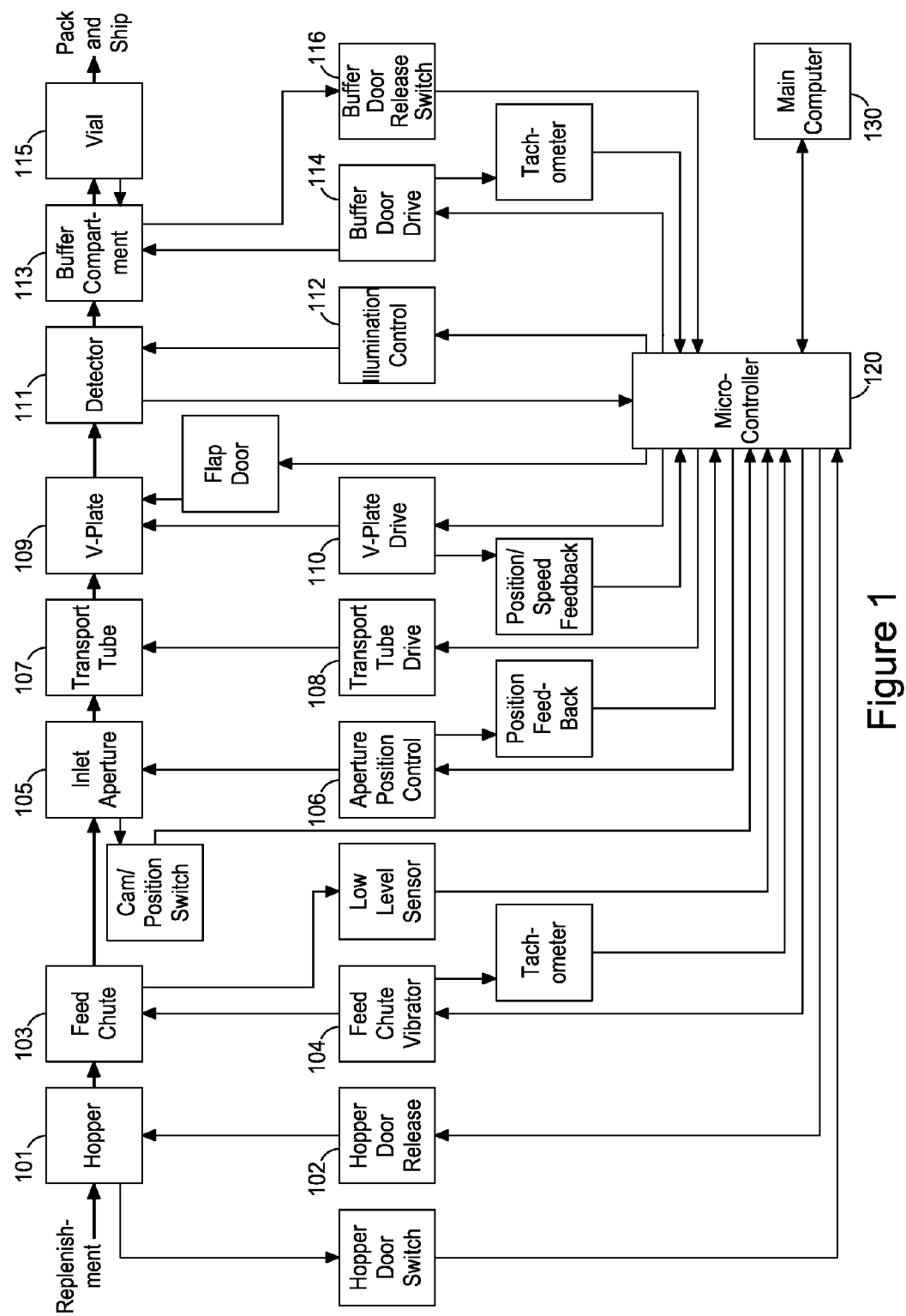
FIG. 1 is a block diagram depicting the various parts of the pill dispenser in accordance with the present invention.
Figure 2:
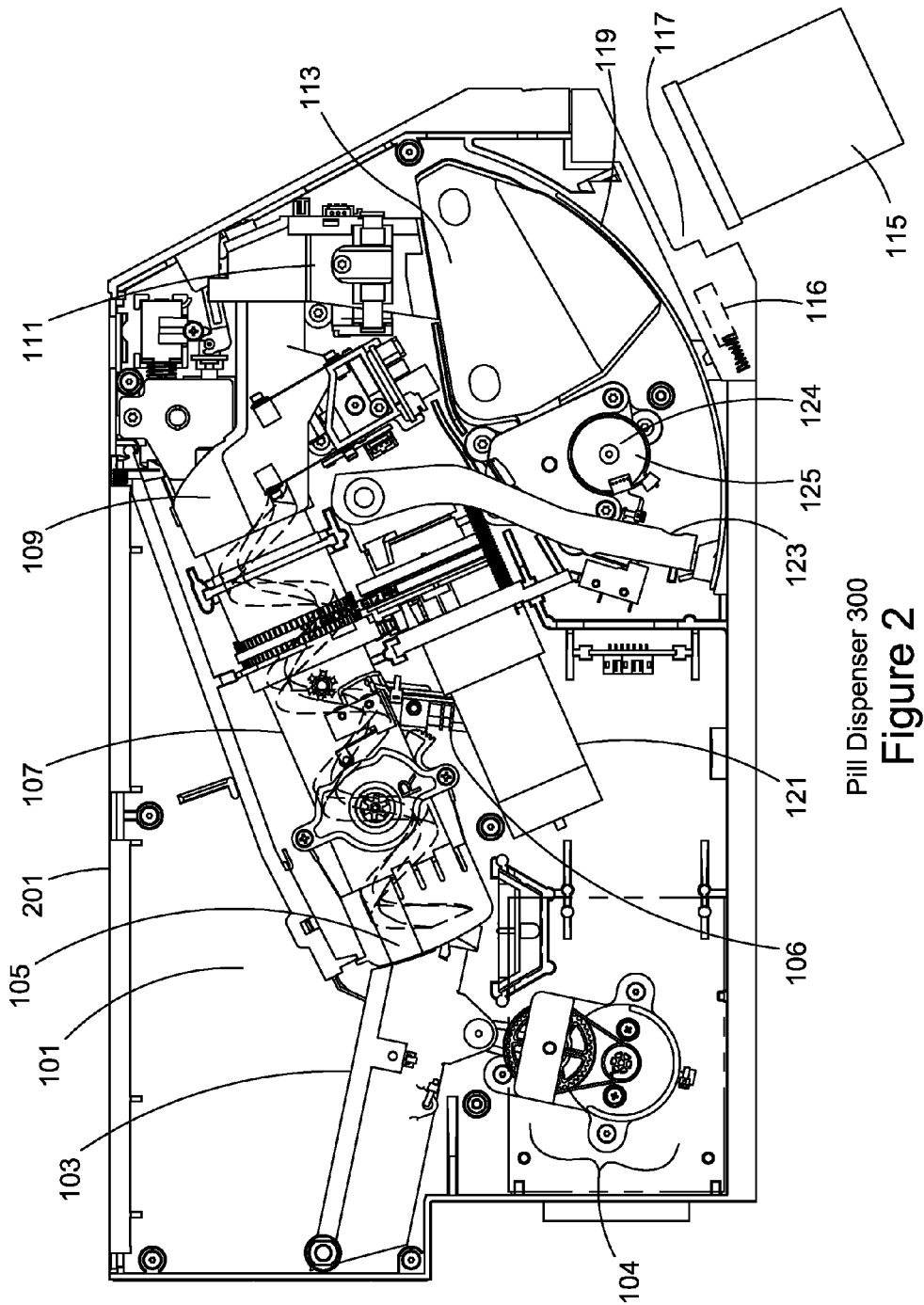
FIG. 2 is a cross-sectional view of the inside of a pill dispensing module.
Figure 3:
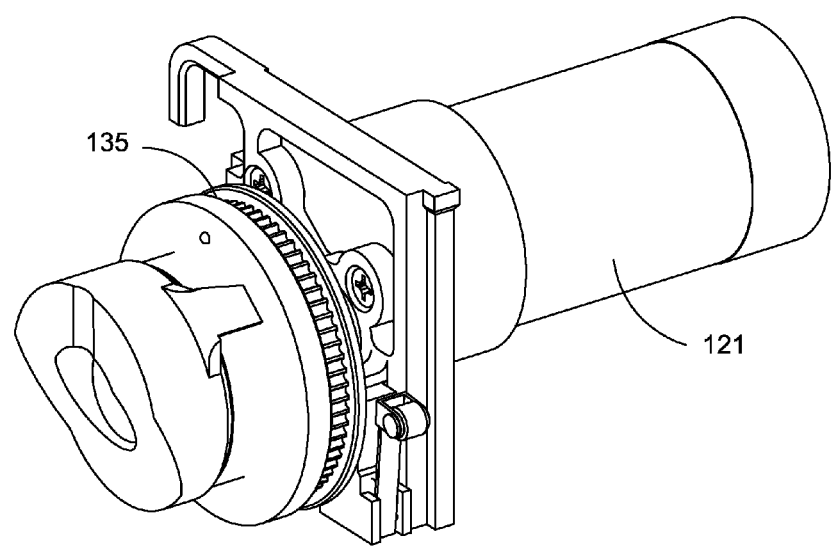
FIG. 3 is a perspective view of a spiral transport tube.
Figure 4:
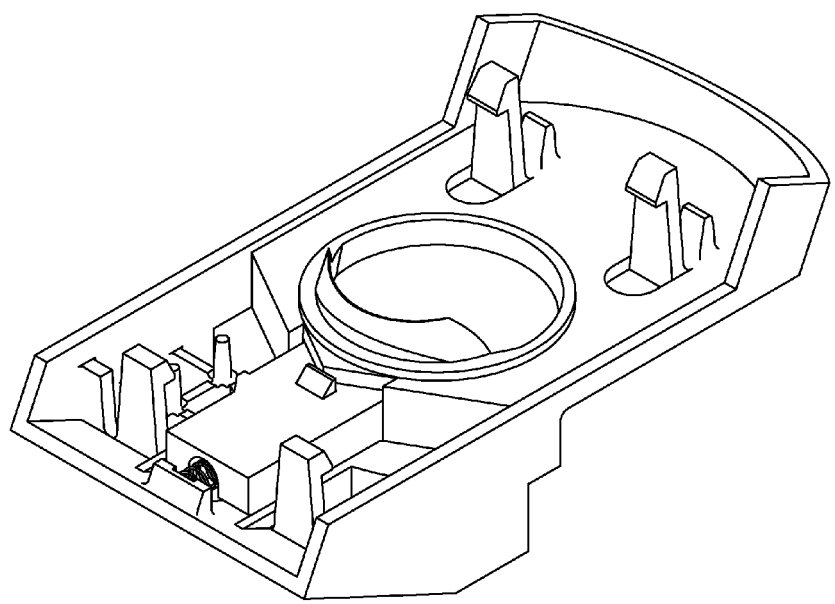
FIG. 4 is a perspective a portion of a vial adaptor subassembly.
Figure 5:
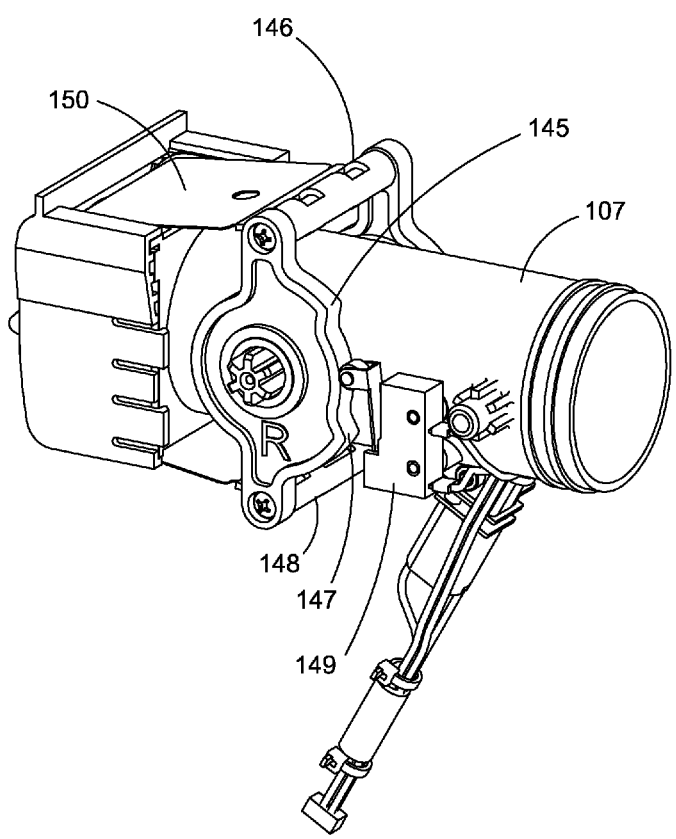
FIG. 5 is a perspective view of an inlet aperture control system.

Referring now to FIGS. 1 and 2, a digital microcontroller 120, such as a Model No. AT Mega 2651 manufactured by Atmel Company, is connected to a main computer 130 and ultimately connected to a hopper 101, a feed chute 103, an inlet aperture 105, a transport tube 107, a vibrating plate ("V-plate") 109, a detector chute 111, and a buffer compartment 113. V-plate 109 is a rigid, metal, plastic, or ceramic surface described in greater detail hereinbelow. Distributed processing, using two or more microcontrollers can also be used. Operatively connected to hopper 101 is a hopper door switch and hopper door release 102, to feed chute 103 is a feed chute vibrator 104 and an associated tachometer, to inlet aperture 105 is an aperture position control 106 and position feedback device, to transport tube 107 is a transport tube drive 108, to V-plate 109 is a flap door, a V-plate drive 110 and an associated position/speed feedback device, to detector chute 111 is an illumination control 112, and to buffer compartment 113 is a buffer door drive 114, a buffer door release switch 116, and an associated tachometer, all directly connected to and under the control of microcontroller 120.

Pills, not shown, move through pill dispenser 300 as hereinafter described. Microcontroller 120 first instructs hopper 101 to open by actuating hopper door release 102 so hopper 101 can be filled with pills. Hopper door 201 may then be opened and filled with pills by an operator. Except for filling, hopper door 201 normally remains closed and locked to prevent tampering or pill theft.

Figure 10A:
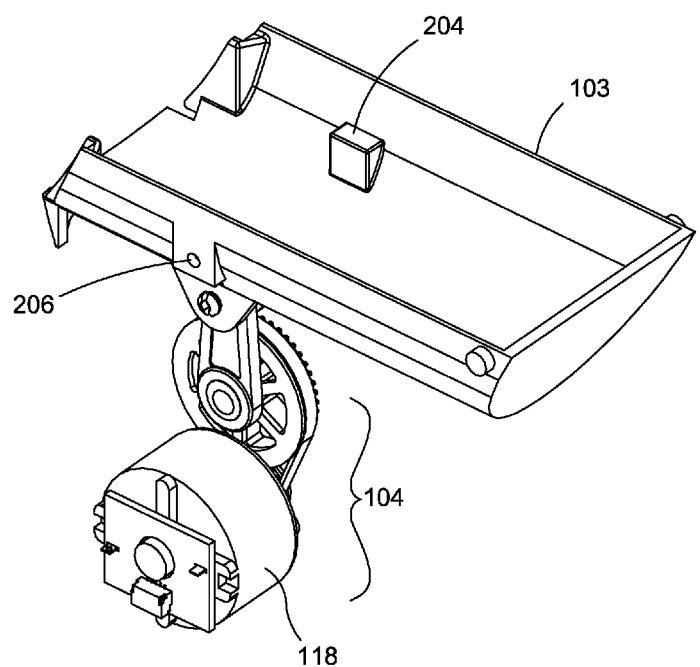
FIG. 10a is a perspective view of the vibratory feed chute shown in FIG. 6.

Located at the bottom of hopper 101 is feed chute 103. An infra red (IR) beam interrupt low level sensor, consisting of low level emitters 204 and low level detectors 206, is built into feed chute 103 as shown in greater detail in FIG. 10a. Emitter 204 and detector 206 enable detection of a low level of pills in hopper 101. When pills are no longer located between emitter 204 and detector 206, an IR beam from emitter 204 passes unimpeded to low level detector 206, signaling microcontroller 120 that pills have reached a low level. (Of course emitter 204 and detector 206 can be exchanged from the positions shown in FIG. 10a.) Microcontroller 120 then generates a signal to alert an operator to replenish the pill supply in hopper 101.

Feed Chute and Transport Spiral Operation

Figure 6:
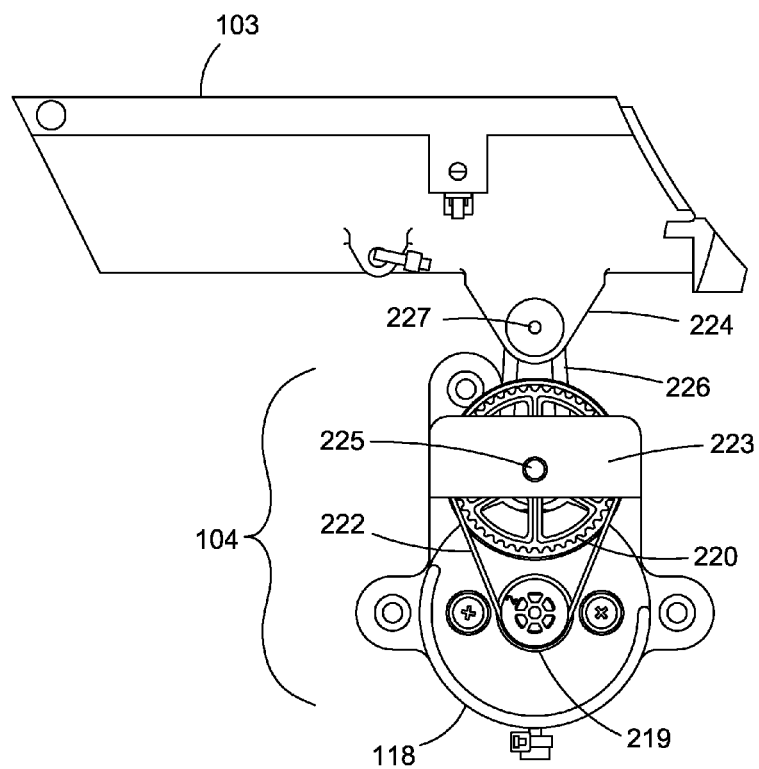
FIG. 6 is a side, plan view of a vibratory pill feed chute assembly.

All pills in hopper 101 ultimately fall into transport spiral 202 in feed chute 103, which is fitted with a feed chute vibrator 104 shown in greater detail in FIG. 6. Feed chute vibrator 104 can be turned on or off by microcontroller 120 to jog pills in feed chute 103. Jogging helps transport pills to transport tube 107 and prevents them from jamming at the bottom of hopper 101 and also helps pills flowing through aperture 105.

Figure 10B:
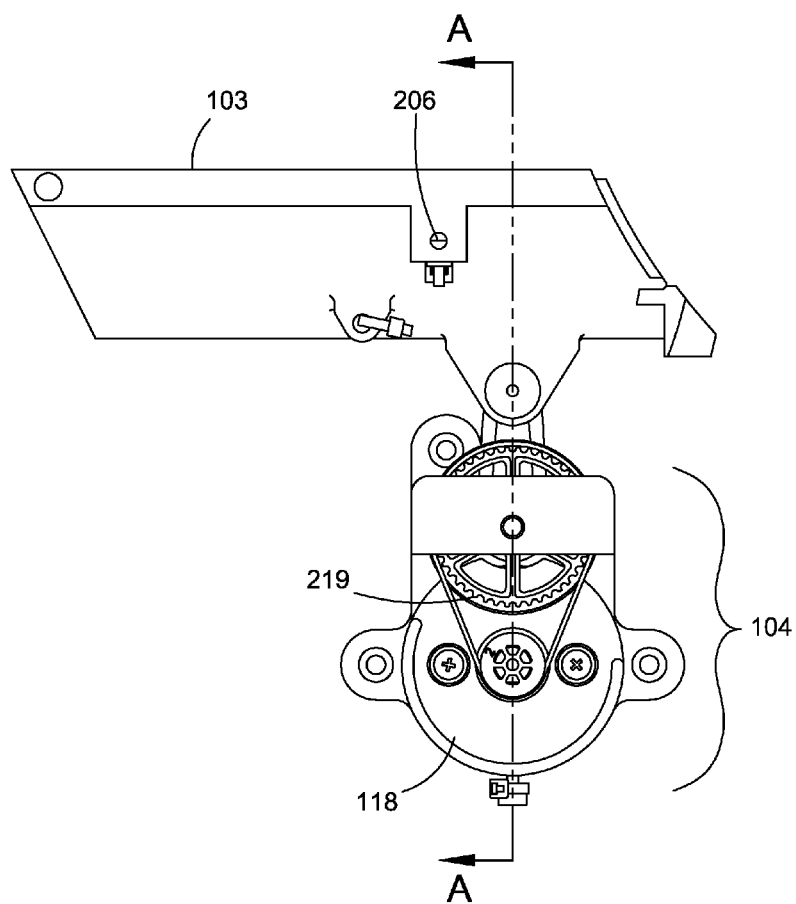
Figure 10C:
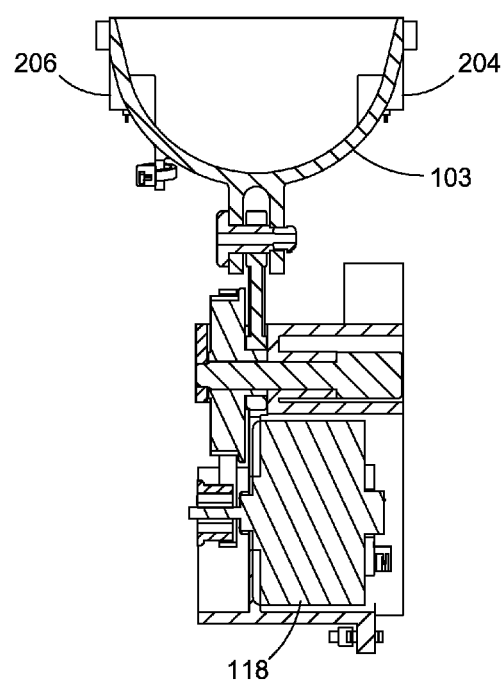
FIG. 10c is a cross-sectional view of the vibratory feed chute taken along lines A-A of FIG. 10b.

Feed chute vibrator 104 is powered by a jog motor 118 shown in FIGS. 6 and 10*b*. Jog motor 118 turns a gear belt pulley 219 and a large gear belt pulley 220 by means of a gear belt 222 disposed therebetween. Large gear belt pulley 220 is journaled by a shaft 225 in a mount 223. Gear belt pulley 220 is coupled to and turns an off center cam (not shown) behind mount 223. The cam drives an arm 226, which is pivotally attached to feed chute 103 at a pivot 227 with an up and down vibratory motion to jog feed chute 103.

Alternatively, feed chute 103 may be jogged by a strong voice-coil linear drive motor 242 or a direct drive stepper motor (not shown) with a cam arrangement similar to the one described hereinabove. The detailed description of pill counting, spiral rotation, and V-plate operations is described hereinbelow with respect to FIG. 14.

Pill Inlet Aperture

Figure 11A:
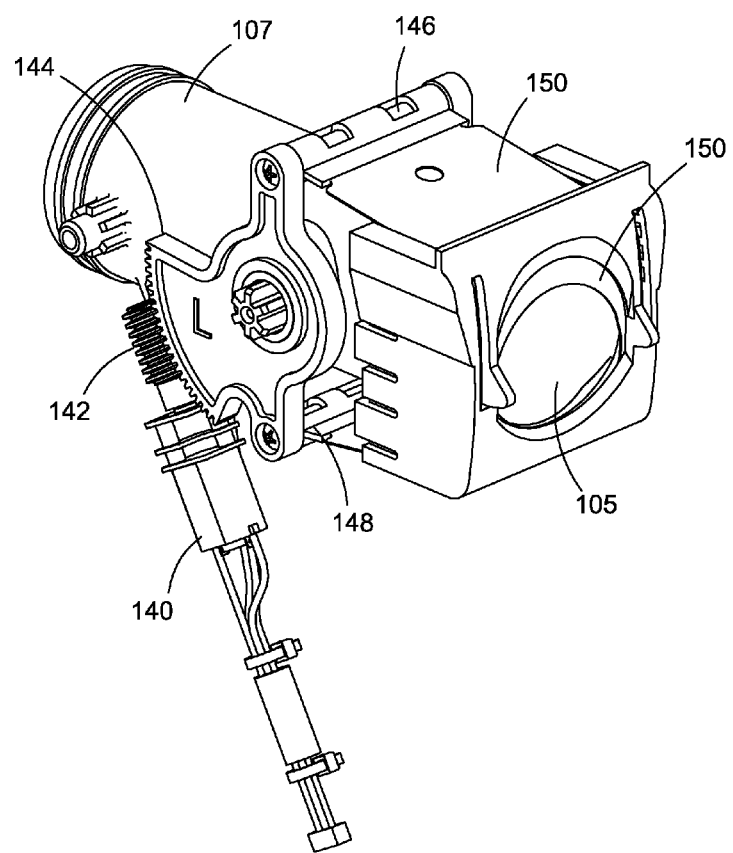
FIG. 11a is perspective view of the inlet aperture control system shown in FIG. 5.
Figure 11B:
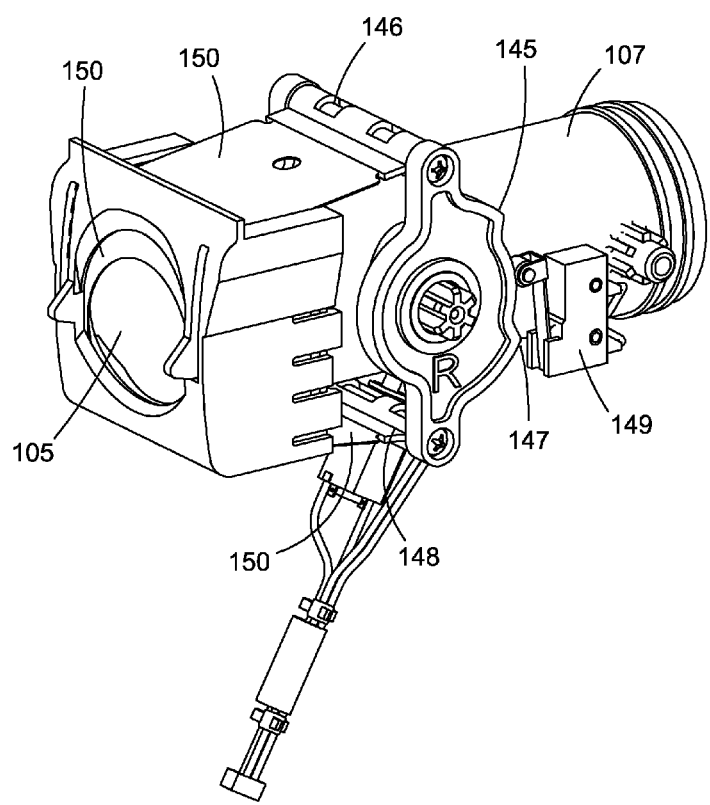

Feed chute 103 directs pills into inlet aperture 105 as depicted in FIGS. 11*a* and 11 *b*. Inlet aperture 105 is formed from flexible plastic film 150, such as polyester film, which can be pulled by an upper mandrel 146 or a lower mandrel 148 to make inlet aperture 105 larger or smaller. The size of inlet aperture 105 is thus adjusted to control the flow rate of pills through it. Mandrels 146 and 148 are driven by a sector gear 144, which is rotated by a worm gear 142 attached to a corresponding gear motor 140. Microcontroller 120 controls gear motor 140 to open or partially close aperture 105, thereby regulating the flow of pills into transport tube 107. A micro switch 149 is triggered by an upper detent 145 or a lower detent 147 to signal microcontroller 120 regarding the condition (full open or closed positions) of aperture 105.

Alternatively, gear motor 140 can be replaced by a stepper motor; and micro switch 149 can be replaced by a radial encoder or Hall Effect sensor to sense small magnets (not shown) mounted in place of detents 145 and 147. A radial encoder would not require detents. This stepper motor arrangement would allow the exact position of aperture 105 to be known at all times by microcontroller 120. Use of a stepper motor in this embodiment also allows for greater simplification by eliminating parts such as gear motor 140, sector gear 144, and/or worm gear 142 while gaining the benefit of greater reliability due to mechanical parts reduction.

Ultimately, the size of inlet aperture 105 is dependent on the size and shape of the pill being transported as well as by the level and weight of pills in hopper 101. Allowing too many pills at once through inlet aperture 105 may result in an overload of V-plate 109 at the top of transport tube 107. If inlet aperture 105 were too small, however, the flow of pills could be too slow or even stopped. Thus, the opening of inlet aperture 105 is typically set according to the type of pill to be dispensed. A feedback system controlled by microcontroller 120 is incorporated to fine tune the size of inlet aperture 105 as hopper 101 is gradually depleted.

Flow control is the method of controlling the gate/aperture position and feed chute vibration in order to maintain a desirable flow (average group size) of product. The gate range can be calibrated for any number of positions, 0-100 in the preferred embodiment. Gate position is closed at 0 and fully open at 100.

Group size is the number of pills transferred on one pitch of the transport spiral. That is, the group size is determined by counting the pills that pass detection each spiral rotation.

The upper gate limit (UGL) is the gate position at which an undesirable flow of pills is observed. The UGL can be established by one of a number of criteria. For example, the UGL may be set to the current gate position if a group size is larger than a specified threshold.

Active vibration takes place when the desired pill flow is less than the minimum group size sliding average and the current gate position is at or near the UGL. Such vibration is attempted before exceeding the UGL. If vibration alone does not increase the group size sliding average, then the gate position and UGL are increased (assuming the gate position has not reached the maximum position).

Two different sets of gate-related operational parameters are defined as pre UGL and post UGL. One set is used as long as the UGL remains uninitialized (i.e., 0). The other set is used while the UGL is set (i.e., non-zero). Another use (or interpretation) of pre/post UGL is fast startup/standard gate reaction. Typically it is desirable for the gate to react quicker and open more aggressively when the dispenser is first put into operation; otherwise, the initial count time could be undesirably long. After the gate establishes a reasonable position, smaller, more precise moves are used.

Gate adjustment amount represents the number of gate positions to move the gate open or closed.

The present system relies on flow control for delivering a consistent rate of pills slightly slower than the V-plate can accept them. The V-plate separates and delivers pills to the detection chute. In theory, the present system can operate efficiently and accurately with a slower spiral RPM and larger average group sizes. Larger average group sizes increases the average count rate due to the lower probability of empty pitches, especially detrimental during singulation.

Calibration of Gate/Aperture Position and Feed Chute Vibration

For DC motor operation, the time from input aperture being closed to fully open is measured while running the motor continuously. The full open time is divided by the number of desirable segments resulting in the segment time. After returning input aperture to closed position, the system pulses the motor (on for segment time off for sufficiently long enough to rest the motor) for total desirable segments.

The time from the input aperture current position to fully open is measured while running the motor continuously to obtain the accumulated ramp-up/ramp-down motor delay, which is then divided by the number of desirable segments resulting in the segment ramp-up/ramp-down motor delay time.

The necessary segment move time (in the opening direction) is calculated by adding the segment time to the segment ramp-up/ramp-down motor delay time. The aforementioned steps are performed to determine segment move time (in the closing direction). After changing direction, linkage play is calculated and applied whenever the gate direction changes.

The edge of a gate CAM, near the full open and closed position, is sensed by a micro switch w/roller actuator, not shown. In general, the system is run beyond the past open or closed position, and then backed up until off CAM. The system is run for a fixed duration off CAM, at which point direction is reversed. The elapsed time is measured while running in the reversed direction towards the CAM. The linkage play time is calculated as the difference between the reverse time and fixed duration time.

For stepper motor operation, CAM to CAM steps between closed and full open are measured and the calculation is repeated in the opposite direction. The CAM to CAM step number is divided by the number of desirable segments to derive the segment steps.

To initialize the system (performed at the beginning of each count) the following steps are performed:

If the desired initial gate position (via parameter) is 0, then:
Load initial gate position from non-volatile memory;
If non-volatile memory holds valid gate information:
Initialize gate related variables from non-volatile memory (i.e., set gate position to the same position as where the last count left off; in effect leave the gate where it is);
Else, non-volatile memory gate information was corrupted or uninitialized.
Initialize gate position to a value between the possible minimum and maximum gate position (knowing the absolute gate position is not critical); Initialize group size sliding average to average of minimum and maximum group size sliding average thresholds;
Initialize active vibrate (vibration that occurs when the Gate is at the UGL) sliding average to 0.
Else, the desired initial gate position is non-zero (specified):
Use specified initial gate position to position gate.

In operation, the system ignores the first N spiral rotations at the beginning of each count ($R_x$), does not update group size sliding average, or make gate moves. This delay allows the dispenser to exclude conditions from the previous count that may inadvertently affect gate-related performance. For example, the $R_x$ buffer release door is opened by running the spiral in the reverse direction. When product is released from the previous order groups, pills on the spiral are forced back down to the bottom of the feed chute/spiral which leaves empty pitches near the top. Each time the spiral rotates, the group size sliding average is updated. The sliding average width is based on whether the UGL has been established.

If an optional bridge buster procedure is enabled and too many groups of zero have been counted, the gate is jostled in an attempt to break up a bridge. If the UGL is not currently established, the following UGL conditions are checked:

Possible conditions to establish UGL:
1)   flow_control_group_size_sliding_average>=flow_control_group_size_sliding_average_limit_lower)
2)   flow_control_group_size_sliding_average>=flow_control_group_size_sliding_average_limit_upper)
3)   flow_control_group_size_sliding_average>=((flow_control_group_size_sliding_average_limit_lower+flow_control_group_size_sliding_average_limit_upper)/2))
4) group_size>0
5) group_size>flow_control_group_size_limit_upper After establishing the UGL, the gate position is reduced. A reduction is performed because the conditions for establishing the UGL are actually undesirable.

There are two major gate/flow control modes: active metering and active vibration. For the active metering mode (calculations and conditionals based on optional UGL functionality), the number of spiral rotations since the last gate move are counted. The system should be properly dampened such that another gate move is prohibited until the effects of the previous move are reflected in the group size sliding average.

If the group size sliding average is less than flow_control_group_size_sliding_average_limit_lower, the following steps are performed:
If opening the gate will exceed the UGL, then attempt vibration before opening the gate further; then transition to Active Vibration; otherwise, increase the gate position.
If the group size sliding average is greater than flow_control_group_size_sliding_average_limit_upper, the gate position is decreased.

In the active vibration mode, if vibration resulted in bringing the group size sliding average within range, then the system returns to the active metering mode. Else, vibration did not result in increased group size sliding average, and the gate position is increased.

Transport Tube and Helical Spiral

As pills pass through aperture 105, they enter transport tube 107. Inside transport tube 107 is located a rotatable helical spiral 202 as shown in FIGS. 12a-12f. Rotation of spiral 202 transports pills up and through transport tube 107 and at the same time singulates them. (Singulation means that pills are caused to move in single file.) For purposes of this discussion, the process of moving pills through transport tube 107 is referred to as "primary singulation" and is described in greater detail hereinbelow with respect to FIG. 14.

The rotation of helical spiral 202 (FIGS. 12a-12c) is controlled by transport tube drive 108. In the preferred embodiment, transport tube drive 108 consists of a transport tube motor 121 that drives a belt 150 coupled by means of pulleys 135 to helical spiral 202. Thus, rotation of tube motor 121 results in rotation of helical spiral 202.

Helical spiral 202, with an outer overall diameter slightly less than the inner diameter of transport tube 107, tends to center itself in transport tube 107.

Figure 12A:
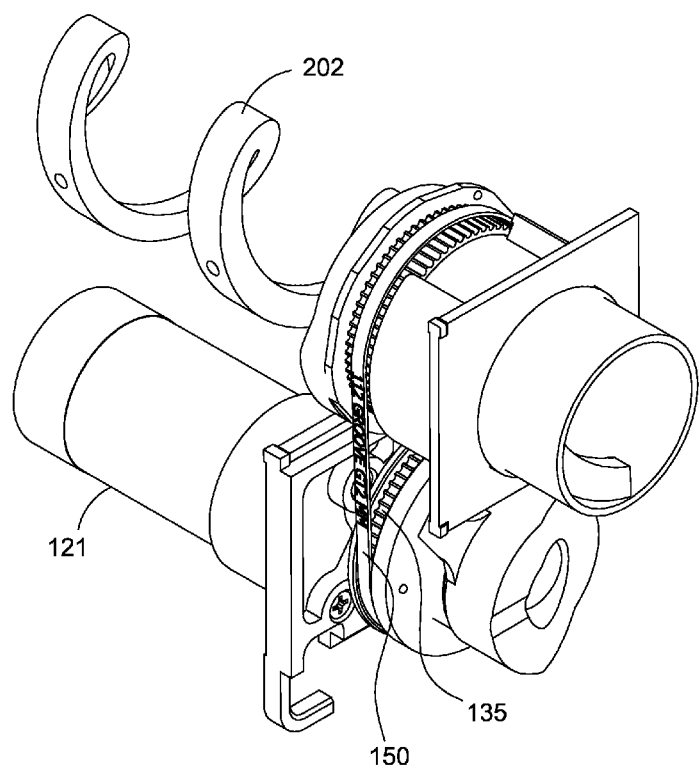
FIG. 12a is a perspective view of a preferred embodiment belt-driven helical spiral drive shown in FIG. 3.
Figure 12B:
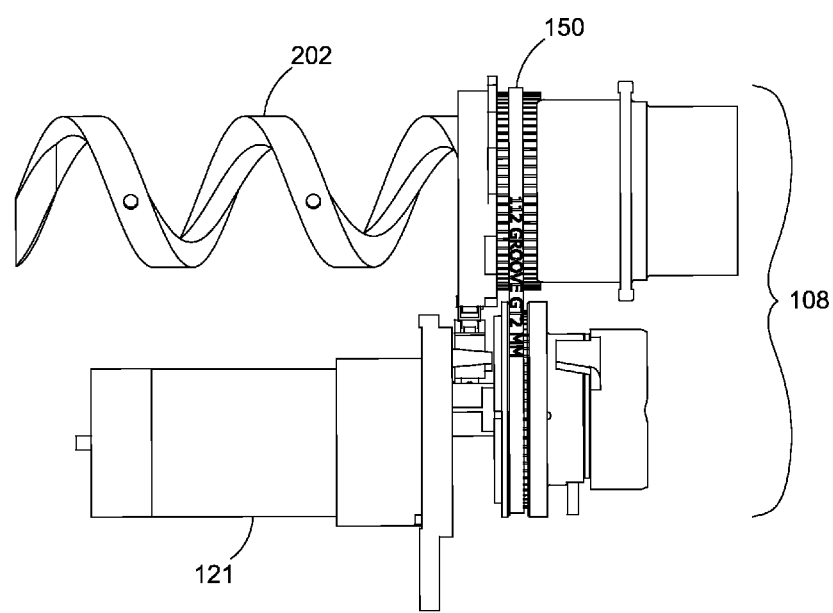
Figure 12C:
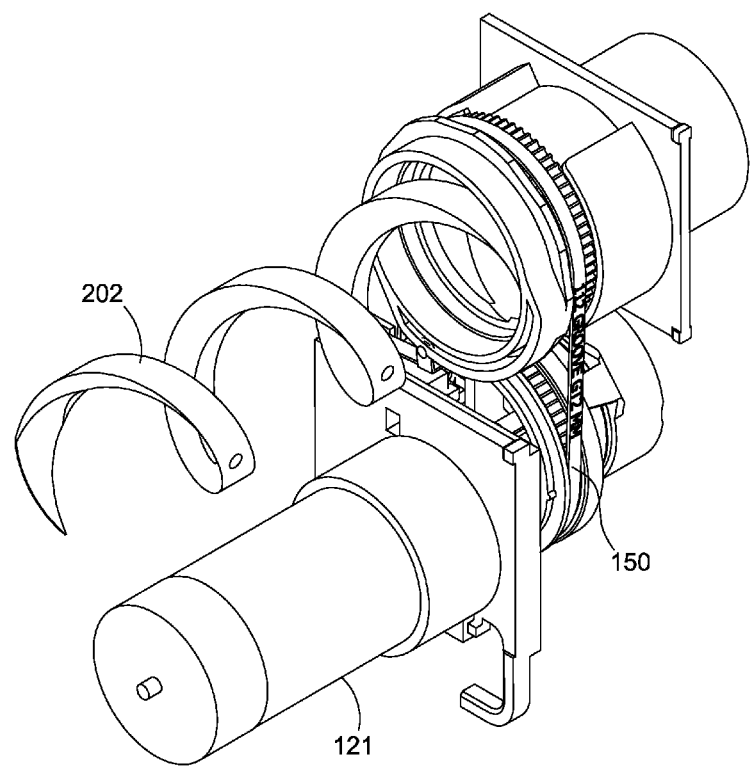
FIG. 12c is another perspective view of the belt-driven helical spiral drive shown in FIGS. 12a and 12b.
Figure 12D:
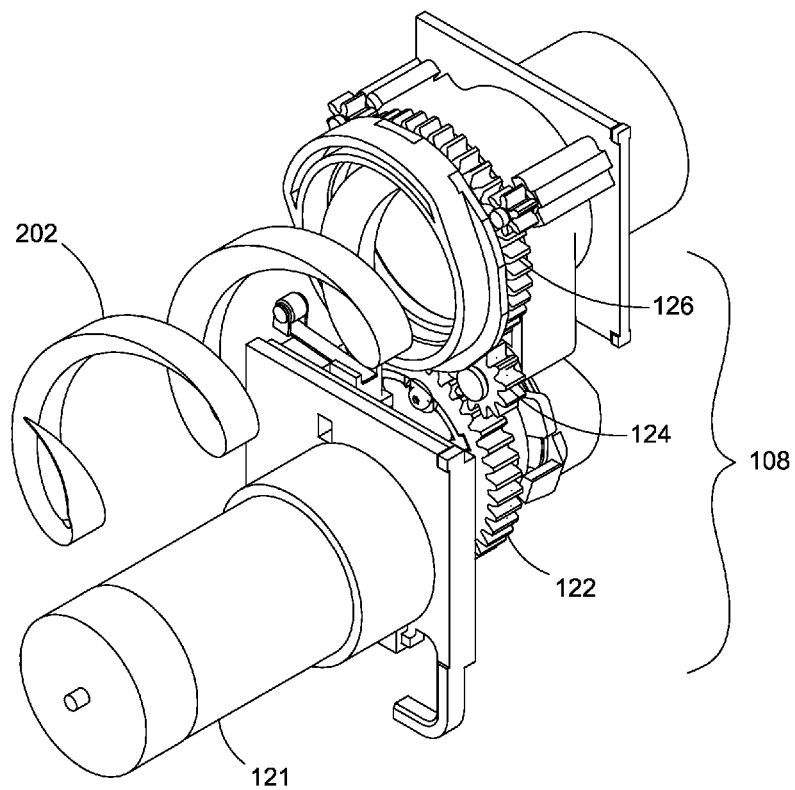
FIG. 12d is a perspective view of an alternate embodiment gear-driven helical spiral drive.
Figure 12E:
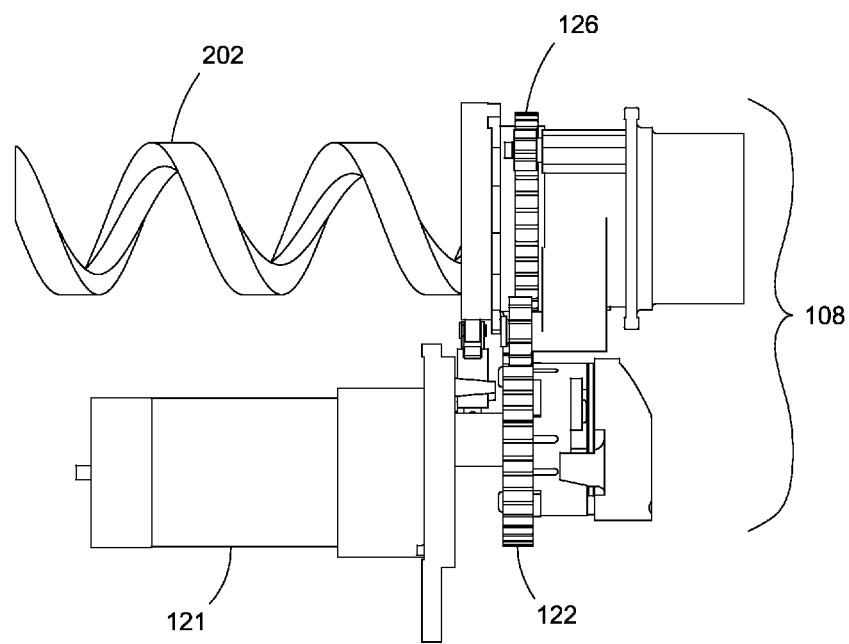
FIG. 12e is another perspective view of the gear-driven helical spiral drive shown in FIG. 12d.
Figure 12F:
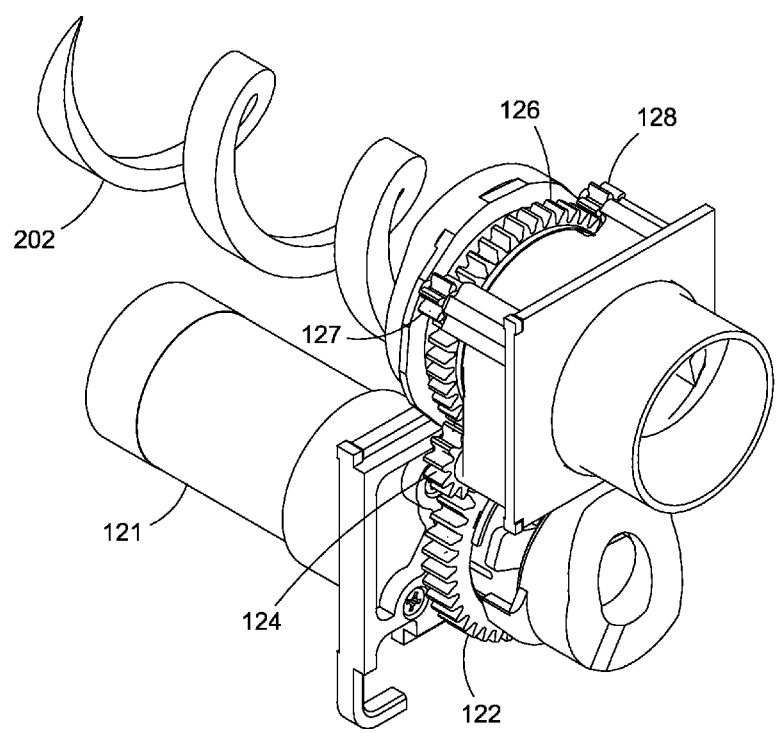
FIG. 12f is another perspective view of the gear-driven helical spiral drive shown in FIGS. 12d and 12e.

In an alternate embodiment, depicted in FIGS. 12d-12f, transport tube drive 108 turns a gear 122, which turns a pinion gear 124, which turns a spiral gear 126. Spiral gear 126 is directly coupled to helical spiral 202. Thus, rotation of tube motor 121 results in rotation of helical spiral 202. Helical spiral 202 and spiral gear 126 are centered and supported by pinion gear 124 as well as idler gears such as idler gear 127 and idler gear 128. It has been found that a total of four idler gears (including pinion gear 124) give ample support to helical spiral 202.

The materials for spiral 202 and transport tube 107 are preferably selected to reduce friction between them and also to minimize buildup of tribo-electric charge between them and pills. The minimization of tribo-electric charge buildup helps reduce unwanted pill dust from sticking to surfaces such as photosensors. One excellent combination of plastic materials for spiral 202 and transport tube 107 is conductive carbon fiber-filled nylon and conductive carbon fiber-filled acetal. By electrically grounding transport tube 107, electric charge buildup is greatly reduced.

Spiral transport tube 107 discharges singulated pills onto V-plate 109. Although primary singulation achieved by spiral transport tube 107 is very good, on rare occasions, especially when pills are very small, two pills can drop out of spiral transport tube 107 together. The present invention therefore employs a redundant stage of singulation by using V-plate 109 to improve reliability of counting accuracy, as described hereinbelow.

V-Plate Operation

V-plate 109 is mounted in a horizontal orientation to prevent pills from rolling down its length at an uncontrolled speed under the influence of gravity. Rather, pills are conveyed at a controlled speed by the vibration of V-plate 109. Conveyance speed is dependent on the frequency and amplitude of V-plate 109 vibration. On the inner walls of V-plate 109 are several strategically placed bumps or protrusions, such as bumps 230 and 231 shown in FIG. 13b. Bumps 230 and 231 stop round pills from rolling uncontrollably by knocking them over and they prevent elongated pills from being conveyed one on top of another "piggy back" style.

Figure 7:
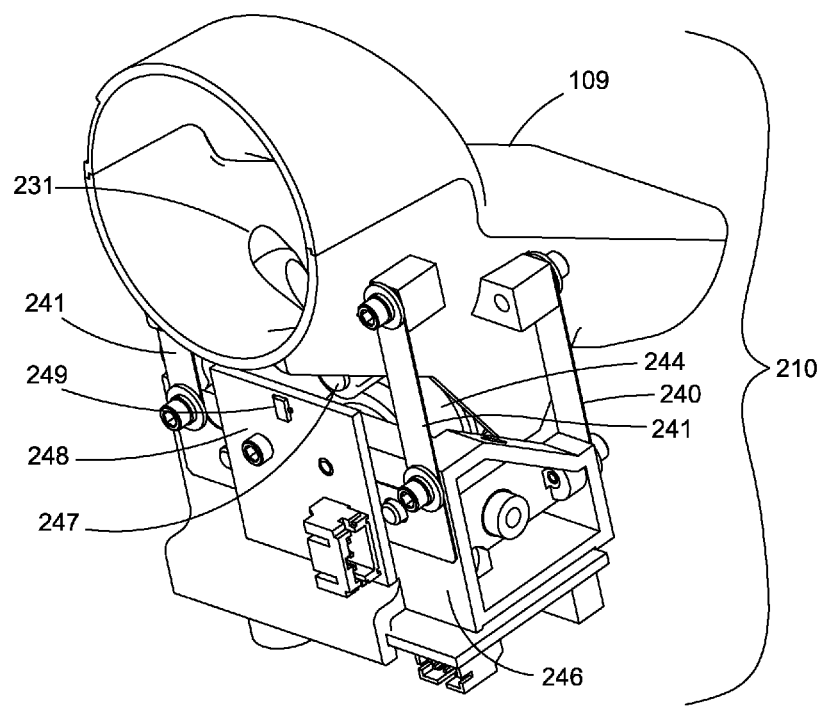
FIG. 7 is a perspective view of a vibration plate ("V-plate") assembly for pill conveyance based on a vibratory feed principle.
Figure 13A:
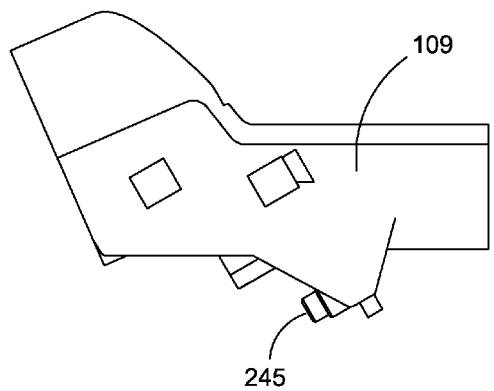
FIG. 13a is a plan view of the moveable part of the vibratory V-plate shown in FIG. 7.
Figure 13B:
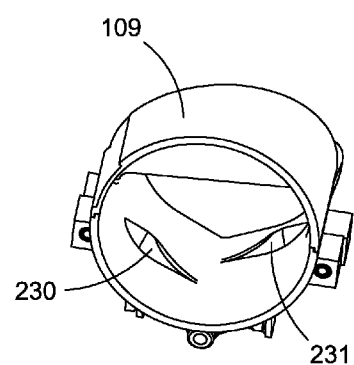

As shown in FIGS. 7, 13a, and 13b, V-plate 109 is mounted on a pair of leaf springs 240 and 241 which are angled so that V-plate 109 can vibrate in an upward and forward direction. A linear voice coil motor drives the vibratory motion of V-plate 109, imparting a micro trajectory to pills, thereby conveying them gently forward toward pill detector chute 111. The principle of vibratory feed as applied here is a well known technique and can even be made to convey small objects up an incline. In this design a horizontal (zero incline) has been chosen as the most general purpose orientation in order to accommodate spherical pills which have a tendency to roll. However, by installing V-plate 109 with a slightly positive slope (inclined upward and forward) an additional dimension of control may be obtained that is useful for tiny non-spherical pills that must be conveyed very carefully, especially at the end of a count. Texture and/or patterns, such as perpendicular ridges, may be incorporated to prevent rolling of spherical pills.

The application of primary singulation provided by transport tube 107 and helical spiral 202 followed by vibratory feed singulation ("secondary singulation") by V-plate 109, as described, produces superior singulation of pills as compared with primary singulation alone. This singulation redundancy tremendously improves count reliability over prior art pill counters. When the amplitude and frequency of vibration of V-plate 109 are properly selected, highly reliable singulation, pill separation, conveyance speed control, and pill count accuracy is attained.

V-Plate Drive

Shown in FIG. 13a mounted to moveable V-plate 109 is a drive magnet 245. Drive magnet 245 is partially immersed (typically ⅓ of its length) into a coil 244 shown in FIG. 7 which is fixed to frame 246 of V-plate assembly 210. Coil 244 is driven by alternating current, preferably with a sinusoidal wave form, which interacts with drive magnet 245, imparting a small but strong amplitude vibration to V-plate 109. Typically V-plate 109 is driven with a frequency less than its resonant frequency; however, V-plate 109 will operate satisfactorily if driven above its own resonant frequency. Driving the vibration above the resonant frequency, however, requires substantially more current to achieve the same amount of vibration. Driving V-plate 109 at resonance, although energy efficient, tends to cause unwanted amplitude variations and therefore speed variations due to small variations in pill loading. As discussed below, choosing a drive frequency below resonance is beneficial in controlling both frequency and amplitude. The ability to stop pill conveyance is essential to prevent one or more extra pills from being dispensed.

A vibration amplitude for V-plate 109 of ±0.013 inches has been found to be suitable for conveyance and singulation of most pills, but that value may be greater or less depending on the desired speed of pill conveyance.

Although a simple sinusoidal drive waveform is efficient for driving V-plate 109, a square wave drive has been found to be adequate, but is not as energy efficient as a sinusoid because it contains high frequency harmonics to which V-plate 109 does not respond. A suitable sinusoidal waveform may be simulated from a series of steps whose amplitude follows that of a sinusoid curve. These may be produced inexpensively using a micro stepper motor drive integrated circuit such as micro stepping driver A4984 produced by Allegro Micro Systems Inc. If a simulated sinusoidal drive waveform is used, the inertia of the V-plate 109 effectively integrates the series of steps into a smooth sinusoidal vibratory motion.

The secondary singulation of pills using vibratory conveyance provides highly regular singulation, superior pill conveyance speed control and stopping, which is essential in achieving accurate pill count. By controlling the amplitude, frequency and phase of the drive signal, the speed and separation of pills is precisely controlled so that pills can be dropped into detector chute 111 one at a time and can be counted accurately. If the count is relatively small, the singulation of pills can occur without performing the rapid phase sequence.

Figure 9A:
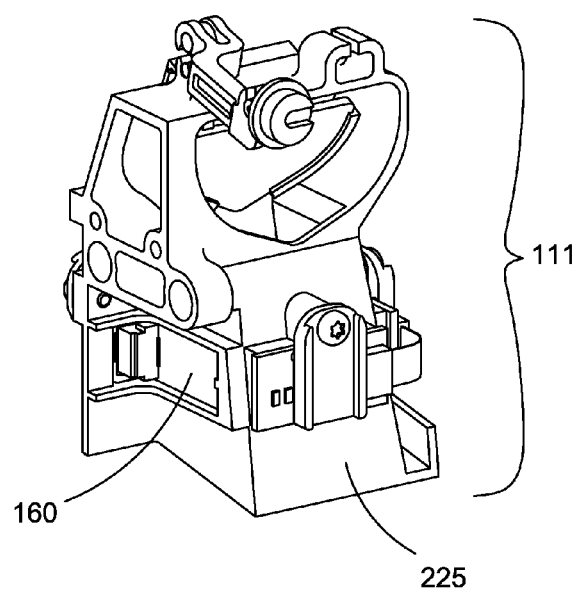
FIG. 9a is perspective view of a detector chute.
Figure 9B:
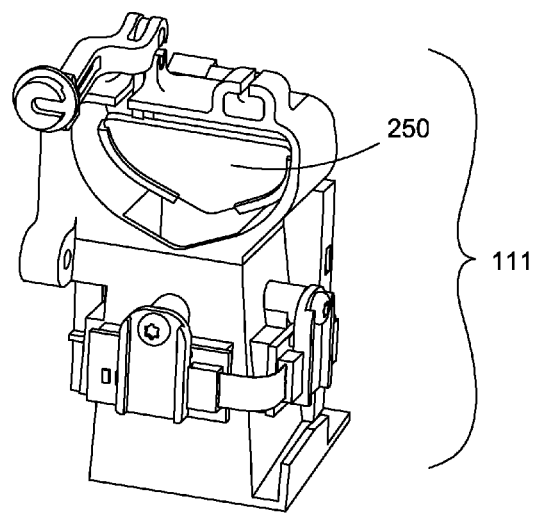

Moreover, as the singulated pills drop through detector chute 111, they each follow a precise trajectory, due to the fact that they are gently conveyed and do not jump wildly about like popcorn popping. Detector chute 111 is designed so that pills fall through it with a controlled trajectory, avoiding contact with the sides thereof. Therefore, dust is not generated in detector chute 111 as would happen if pills were allowed to randomly bang against its sides. Furthermore, as shown in FIGS. 9a and 9b, the sides of detector chute 111, such as side 225, are slightly tapered, wider at the bottom than at the top. This feature allows pill dust to fall out of detector chute 111.

V-Plate Control

Mounted on the moveable portion of V-plate assembly 210 is a sense magnet 247 shown in FIG. 7. Attached to the non-moveable V-plate frame 246 is a circuit board 248 to which is mounted an analog Hall sensor 249. The Allegro Micro Systems Inc. A1325 Hall sensor has been found well suited for this application. Hall sensor 249 senses the field of sense magnet 247 as it moves with V-plate 109 and generates an analog signal proportional to the actual mechanical vibratory displacement of V-plate 109.

This displacement signal is then supplied to microcontroller 120 where it is digitized and used in a feedback control loop to maintain accurate control of V-plate 109 vibratory motion. Although a magnet/coil sense arrangement could have been used to achieve sense control, such an arrangement would have been more complex since it would be strongly influenced by frequency of vibration as well as displacement, whereas the Hall sensing method is not frequency dependent and can be calibrated to measure instantaneous displacement as little as one thousandth of an inch.

The system uses an open loop (i.e., no feedback) electromechanical pulse generator with ringing prevention/cancelation. This functionality is imperative for precisely controlled transport and separation of pills at the end of a count.

As hereinabove mentioned, the V-plate is operated in one of two modes at a time: continuous and pulsed. For simple mathematical modeling purposes, the V-plate is a mass on the end of a cantilever spring. The V-plate is driven by a stepper motor driver (Allegro A4984) in eighth step microstep resolution mode. Basically, the driver can be used to generate a current sine wave source.

The natural frequency waveform (or a waveform reasonably close to the natural frequency) of the V-plate assembly is a sinusoidal wave. The drive frequency is 3/2 times the natural frequency. Each "pulse" consists of three drive periods followed by a phase shift.

Whenever the drive signal and V-plate are acting in the same direction, mechanical energy is being added to the system; and whenever drive signal and V-plate are acting in opposite directions, mechanical energy is being canceled. A more accurate assessment of the net energy would be to integrate the two waveforms and combine the results; given their symmetry the net result would be zero as well.

The phase shift inserted between each pulse cancels any residual energy due to real world component variances and device mechanical response. This comes into play where the pulsed period is longer than one pulse. Without the phase shift, residual energy will accumulate and ringing will result after the drive is terminated.

In operation, the system counts the negative slope zero crossings; whenever the count is an increment of 3, the drive current is held at zero for ¼ waveform (i.e., 90 degrees or π/2 radians) to produce a phase shift.

When the pulsed period is to be terminated, the drive waveform is discontinued after the phase shift. Otherwise, the drive waveform is continued.

Stopping Pills at End of Count

As pills drop through detector chute 111, optical or infrared (IR) LED sensors 170, 172a and 172b (upper and lower levels of the two-dimensional array) detect them passing through, so they may be electronically counted. Once the correct pill count is reached, it is important to immediately stop pills from progressing forward via the vibratory conveyance of V-plate 109; otherwise, an extra pill may fall through detector chute 111. This would be a highly objectionable occurrence. Hence, the vibratory conveyance must be stopped abruptly.

At the same time V-plate 109 is stopped, flap door 250 is closed to cut off pill flow to detector chute 111. For certain pills, especially those that are tiny, it has been found to be advantageous to slow down pill conveyance to the detector area when the desired count is almost reached, causing the last few pills to progress more slowly in order to achieve a precise count. By executing a start/stop (jogging) of V-plate 109, the final pill is dropped; then flap door 250 is closed. V-plate flap door 250 also prevents pills from entering detector chute 111 when the dispenser is jostled or transported.

Dust Control

Certain pills are characteristically very dusty even as supplied and when they are handled. In order to address the problems associated with naturally dusty pills, the materials of transport tube 107, helical spiral 202 and detector chute 111 have been specially selected. These parts are made from electrically conductive materials and are grounded. Preferably, they are molded from low friction electrically conductive graphite-filled plastics such as graphite-filled nylon and acetal.

As previously mentioned, when two different materials like pills and plastic slide in contact with one another, turboelectric charge is generated. Charged pill dust can stick to non conductive surfaces and buildup causing moving parts to wear. Even worse, if such dust sticks to the face of optical sensors, it can blind the sensors and lead to miscounted pills and equipment down time. However, if the plastic is conductive and grounded, specific areas of charge on the surface of the dust where it contacts the grounded plastic can be neutralized. This helps control the unwanted effects of sticky electrically-charged dust.

Part of a charged dust particle not in contact with grounded plastic can retain unwanted charge until it is discharged. Particles of dust are conveyed by V-plate 109 and can fall through detector chute 111. However, detector chute 111 is shaped with a slightly inverted funnel shape so pill dust tends to fall through it and out of the dispenser and substantially avoids contaminating the face of optical detectors which are recessed in area 160 of FIG. 9a in chute 111. This technique helps the dispenser 300 cleanse itself in the critical detector area and shield optical parts from pill dust contamination.

Although the aforementioned dust cleansing design is efficient, it is not perfect for some pills. In such cases, a further means of dust control may be used when needed. This is achieved by introducing into the dispenser 300, especially along the pill path and detector areas, a gentle inflow of positively- and negatively-charged ionized air. When this step is performed, the entire surface of charged dust is electrically neutralized and does not tend to stick to surfaces inside dispenser 300. Air ionizers are commercially available for static electricity and dust control. One ionizer may be used to supply ionized air to more than one dispenser, or a miniature air ionizer may be added to the inside of dispenser 300.

Detector Operation

Figure 8:
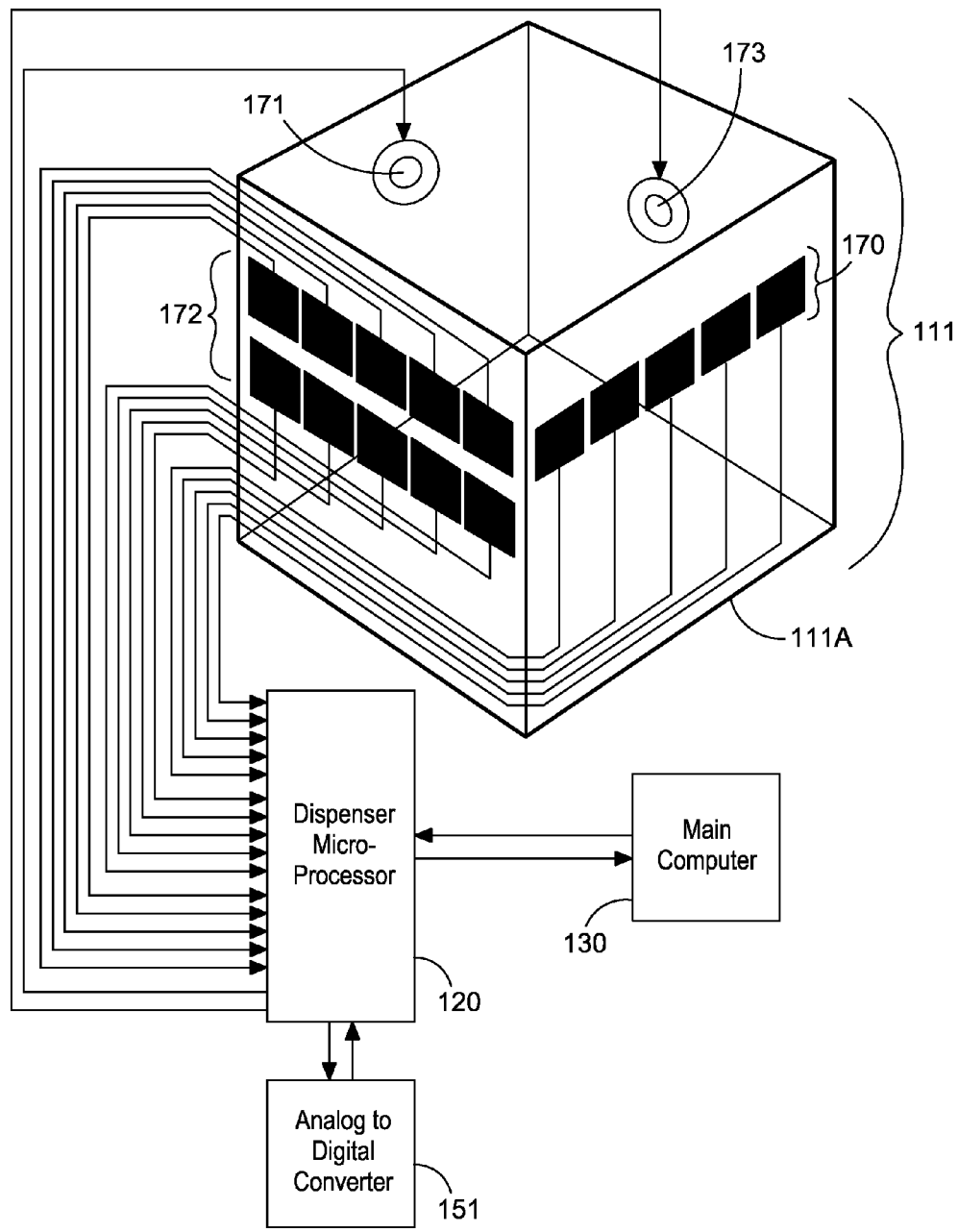
FIG. 8 is a schematic diagram of an optical pill sensing chute and associated controls.

Detector chute assembly 111 as depicted in FIGS. 8, 9a, and 9b, is adapted to distinguish among single pills, two pills, or a pill fragment. Detector chute assembly 111 has two orthogonal rows of photodetectors: a single detector row 170 and a double detector row 172. Opposite single detector row 170 is an Infrared (IR) LED 171 and opposite double photodetector row 172 is an IR LED 173. Typically, the photodetectors are PIN photodiodes for high speed response, but phototransistors can also be used. Each detector row has multiple photodetectors; five are shown in each row. If higher resolution is desired, more detectors can be used, but five have been found to be adequate for most purposes.

Detector chute 111, which mounts the rows of photodetectors and IR LEDs, is preferably made from black, electrically-conductive plastic. The black plastic minimizes unwanted internal reflections of infrared light from the IR LEDs so that each IR LED illuminates the row of detectors opposite and associated with it, and has minimal illumination effect on the row of photodiodes orthogonal to it. Each photodiode is typically coupled to an amplifier (not shown) which converts the current from each photodiode to a voltage output signal proportional to the infrared light falling thereupon. The signal from each amplifier is then converted to a digital signal using analog to digital converters so the signals can be processed by microcontroller 120.

Optical components (e.g., lenses, collimators, prisms), not shown, can also be incorporated to achieve a uniform light curtain, minimizing the effects of position within the field of view.

The multi-segmented detection arrays, in combination with ADC readings of each segment, allow for width and density (percentage) of blockage measurements. The addition of the velocity array (V-array) allows the 3D flash detection system to measure and compensate for velocity. Since faster-moving items appear to have shorter profiles, removing the velocity component from detection calculations results in more accurate relative comparisons of separate items or item groupings.

Detecting blockage (silhouette) is not equivalent to measuring an item's volume. Two items concurrently passing through the detection field can cast a wide range of blockage, ranging from a minimum value up to four times the minimum value. Other factors to consider include, but are not limited to, the effects of ambient light (or light from the adjacent emitter), light reflections, detection segment spacing (gaps between segments and the non-detecting region around the edge of the detection surface), and over sampling.

As a pill falls past the two orthogonal rows of photodiodes, it partially occludes (shadows) some of the infrared light falling on the photodiodes in each row.

Also, since a pill drops off V-plate 109 in a controlled manner, executing a controlled trajectory, the pill drops at a particular speed under the influence of gravity and occludes light falling upon the photodiodes for a certain period of time. Double detector row 172 provides accurate speed data for a falling pill, two pills, or a pill fragment. The light occlusion signals from all of the photodiodes including the occluded light signals vs. time data constitute three-dimensional analog pill data signals that correlate to the relative volume of the pills falling past sensor arrays 170 and 172.

The digitized signal from each photodiode is clocked and processed by microcontroller 120 using appropriate algorithms to measure characteristics of, and count pills. A pill fragment produces less occlusion signal than a whole pill, so fragments are easily discernable. On the other hand, if the occlusion is great and/or lasts too long, it can be deduced that two pills fell together.

In order to understand blockages handled by the present inventive system, definitions are hereinbelow presented.

Blockages are scaled to a common range in a process called "normalization of blockage." For example, each of the five segments in a detection array may have a unique range of possible readings (quiescent to fully blocked). In order to compare or combine segment readings, a common unit of measurement is established and each segment is scaled in accordance with this equation:

$$\text{Normalized Reading} = \frac{(RawReading - Q)}{RawMax - Q} * DesiredNormalizedMax$$

The sum of normalized blockage for all detectors in a common detection array is produced by a process known as "composite blockage," as described hereinbelow with reference to the following equations:

$$X - \text{Composite Blockage: } B_{COMPX} = \sum_{n=0}^{n=4} B_{NX(n)}$$

$$Y - \text{Composite Blockage: } B_{COMPY} = \sum_{n=0}^{n=4} B_{NY(n)}$$

$$V - \text{Composite Blockage: } B_{COMPV} = \sum_{n=0}^{n=4} B_{NV(n)}$$

"Slice volume" is derived from the Composite X-Detection Array blockage multiplied by Y-Detection Array blockage for a given detection segment sweep or slice, as shown with reference to this equation:

$$\text{Area (slice volume): } \sum_{n=0}^{n=4} B_{NX(n)} \cdot \sum_{n=0}^{n=4} B_{NY(n)}$$

"Volume" is the sum of the slice volumes over a regular periodic sampling period, which starts when a blockage is detected until the blockage is not present.

$$\text{Volume: } \sum^{Slices} \left[ \sum_{n=4}^{n=0} B_{NX(n)} \cdot \sum_{n=4}^{n=0} B_{NY(n)} \right]$$

The detection firmware determines the pulse length and the volume of objects passing through the field of view. Measurements and calculations are used to determine pulse length and volume. Empirical analysis of pulse and volume data distributions has shown some degree of fragment, single object, and double objects overlap. For this reason, pulse measurements, which offer a more definitive indication of fragment or doubles, is checked first. If the pulse does not appear to represent a fragment or double, then volume thresholds are checked.

Once the pulse and the volume are ascertained, they can be compared against specified thresholds to determine if the object was two pills, a single pill, or a fragment thereof.

With the aforementioned data, microcontroller 120 can accurately count pills as they pass through detector assembly 111 and pill fragments and multiple pills can be distinguished from single whole pills.

Buffer Control and Operation

Once pills fall through detector assembly 111, they accumulate in buffer compartment 113 shown in FIG. 2. When buffer 113 has the required number of pills, microcontroller 120 signals main computer 130, and a light on the faceplate of dispenser 300 signals the pill prescription is complete.

The system can be programmed to release buffer 113 when a robot places an empty vial against buffer compartment outlet 117, or a human operator presses an empty vial against buffer compartment outlet 117. Buffer door release switch 116 is activated and buffer door 119 slides open, allowing the counted pills to drop into a vial 115. A buffer vibrator 125 simultaneously is switched on by microcontroller 120 to prevent pills from jamming as they exit buffer compartment 113. The amplitude and frequency of vibration can be modified for different pill types, surface texture, and quantities. From there, vial 115 is capped and sent on to be delivered.

Dispenser Self-Calibration

Pills manufactured by different suppliers for the same drug are often different sizes and shapes. When pills of different sizes and shapes fall through detector chute 111, photodetectors 170, 172a, and 172b are activated to different degrees and for different times, generating pulses of different amplitudes and widths. The amplitude signals are affected by how much photodetector area 160 is obstructed by the falling pill. The pulse width generated by a falling pill is related to the time it takes a pill to fall past the detector chute 111.

As pills fall through detector chute 111, they can tumble and assume different orientations. Pills of a specific size and shape can therefore generate various detector pulse widths and signal amplitudes that differ randomly but nevertheless have a characteristic statistical distribution.

To count pills reliably, pill dispenser 300 must be calibrated for the specific pill being counted and dispensed. An important feature of the dispenser 300 is its dynamic self-calibrating feature as hereinbelow explained and with reference to FIG. 16.

Auto-Calibration is the ability for the dispenser to establish parameters based on system-supplied information and operational stimuli. For example, the gate method hereinabove described can be considered a component of auto-calibration; feedback from detection is used to control feed chute vibration and gate/aperture position in order to maintain a group size average between two set points. Another example is detection emitter levels; emitter levels are increased until all associated detector levels are within a desired operational range.

In auto-calibration of counting thresholds, counting thresholds are used to bin blockages into three groups: fragments, singles, and doubles (or more precisely, a plurality). Auto-calibration involves storing pulse and volume information for every pill (limited by memory) in each count internally to the dispenser. At the end of the count, the outliers (min and max values) are discarded and the remaining sample is used to determine the instant thresholds. Critical dampening is achieved by applying the instant thresholds to a sliding average. Auto-calibration allows counting thresholds to be based on individual dispenser characteristics and environmental conditions.

Instant thresholds are based on the current count, whereas active thresholds are represented by a sliding average based on instant thresholds. If auto-calibration is enabled, active thresholds are used to count blockages. Instant thresholds, active thresholds, and a number of underling calculations and data are reported from the dispenser to the system so engineers may evaluate performance and potential performance.

Initialization (dispenser reset) is performed when the dispenser is powered up and reset. Algorithm coefficients are initialized.

Initialization for each count is performed at the beginning of a count/$R_x$. The system determines whether active thresholds should be initialized from specified counting parameters with a weight, such that reaction will be equivalent to having a well-established sliding average. If auto-calibration has been previously established and no profile altering configuration changes have taken place, active thresholds and related variables are initialized from non-volatile memory.

In operation, as the dispenser counts an order, pills fall through the detection field-of-view. Depending on the grouping of pills as they pass through detection, a blockage could represent a fragment, one pill, or a plurality of pills. Characteristics of each blockage are passed from the detection subsystem to the main controller where they are stored in temporary memory. Blockage characteristics consist of:

Volume,
X-Array Pulse duration,
Y-Array Pulse duration,
V-Array Pulse duration,
Current total fragment count,
Current total pill count,
Pulse duration (pulse based X-array or Y-array blockage),
Separation duration (time from trailing edge of previous blockage to leading edge of current blockage),
X-array position,
Y-array position,
Velocity (i.e., time for blockage to travel from leading edge of X-array or Y-array to V-array), and
Compensation calculations (applied to above values):
  Volume compensation to compensate for gaps between detector segments.
  Volume compensation to compensate for position-related distortion.
  Velocity compensation to compensate for position-related distortion.
  Pulse compensation to compensate for position-related distortion.
  Volume compensation to compensate for velocity-related distortion.
  Pulse compensation to compensate for velocity-related distortion.

After a count completes a minimum and maximum, a pulse value is determined from the stored blockage characteristics, a specified percentage of outliers are discarded, and the minimum and maximum pulse is determined from the remaining sample. Similarly, a minimum and maximum volume value is determined, a specified percentage of outliers are discarded, and the minimum and maximum volume is determined from the remaining sample.

Instant thresholds are calculated by applying the following simple algorithm:

$$\text{Instant Pulse Fragment Threshold} = \text{Minimum Pulse} \times \text{CPFB} + \text{CPFA}$$

$$\text{Instant Pulse Double Threshold} = \text{Maximum Pulse} \times \text{CPDB} + \text{CPDA}$$

where CPFB, CPFA, CPDB, and CPDA are predetermined calculation coefficients.

$$\text{Instant Volume Fragment Threshold} = \text{Minimum} \times \text{Volume} \times \text{CVFB} + \text{CVFA}$$

$$\text{Instant Volume Double Threshold} = \text{Maximum Volume} \times \text{CVDB} + \text{CVDA}$$

where CVFB, CVFA, CVDB, and CVDA are predetermined calculation coefficients.

Instant thresholds are applied to a sliding average (or active thresholds) using the following method:

$$\text{New Average} = ((\text{Previous Average} \times (\text{width} - \text{weight}) + \text{new Value} \times \text{weight})/\text{width}).$$

Figure 14:
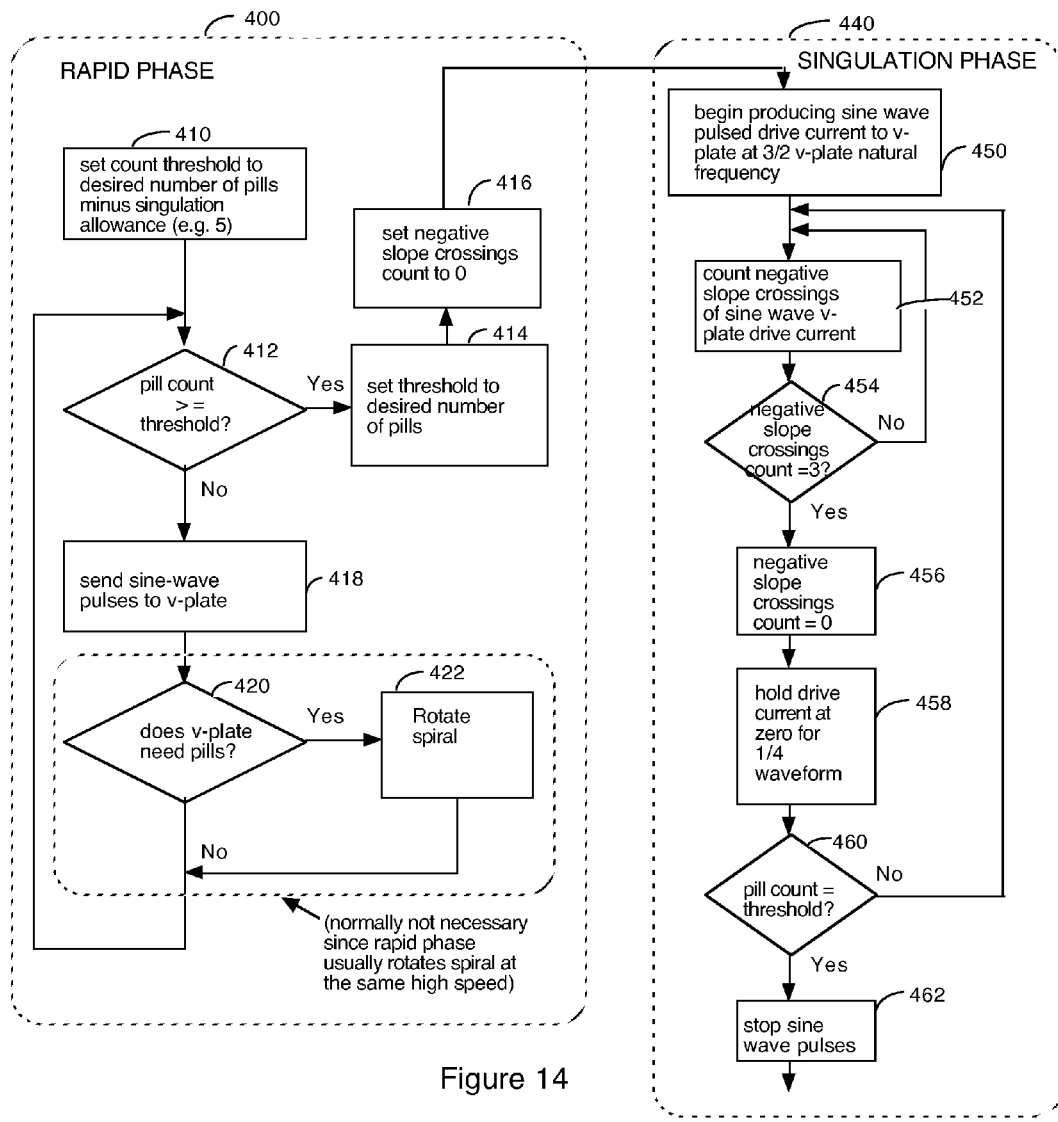
FIG. 14 is a flow chart of the rapid and singulation phases of pill dispensing operations.

Referring now to FIG. 14, a flow chart of the rapid and singulation phases of pill dispensing is shown. In the rapid phase 400, the count threshold is set to a desired number of pills minus a singulation allowance, described hereinbelow, step 410. A preferred singulation allowance for purposes of this description is 5.

If the actual pill count is equal to or greater than the threshold value, step 412, the threshold value is set to the desired number of pills, step 414 and negative slope crossings count is set to 0, step 416.

If, however, the actual pill count is less than the threshold value, step 412, sine wave pulses are sent to V-plate 109 (FIGS. 1, 2, 7, 13a, and 13b) via linear motor coil 244, step 418. If the system determines V-plate 109 has no pills thereon, step 420, spiral transport tube 107 is rotated, step 422. If V-plate 109 has pills thereon, step 420, control returns to determine whether the pill count is equal to or greater than the threshold value, step 412, and operations continue as hereinabove described.

Steps 420 and 422 are not required under normal conditions, as spiral transport tube 107 is rotated at a constant high speed during rapid phase 400.

The singulation phase 440 is entered after the negative slope crossings count has been set to 0, step 416. Sine wave pulses are sent to V-plate 109 at 1.5 times the natural frequency of V-plate 109 via linear motor coil 244, step 450. The system counts the number of negative slope crossings of the sine wave, step 452. If the negative slope crossings count does not equal 3, step 454, counting of the negative slope crossings continues, step 452.

If, however, the negative slope crossings count does equal 3, step 454, the negative slope crossings count value is reset to 0, step 456 and the drive current applied to linear motor coil 244 is held to 0 for ¼ of the waveform, step 458.

The system then determines whether the actual pill count equals the threshold, step 460. If not, counting of the negative slope crossings continues, step 452, as hereinabove described. If, however, the actual pill count does equal the threshold, step 460, the sine wave pulses are terminated, step 462.

Figure 15:
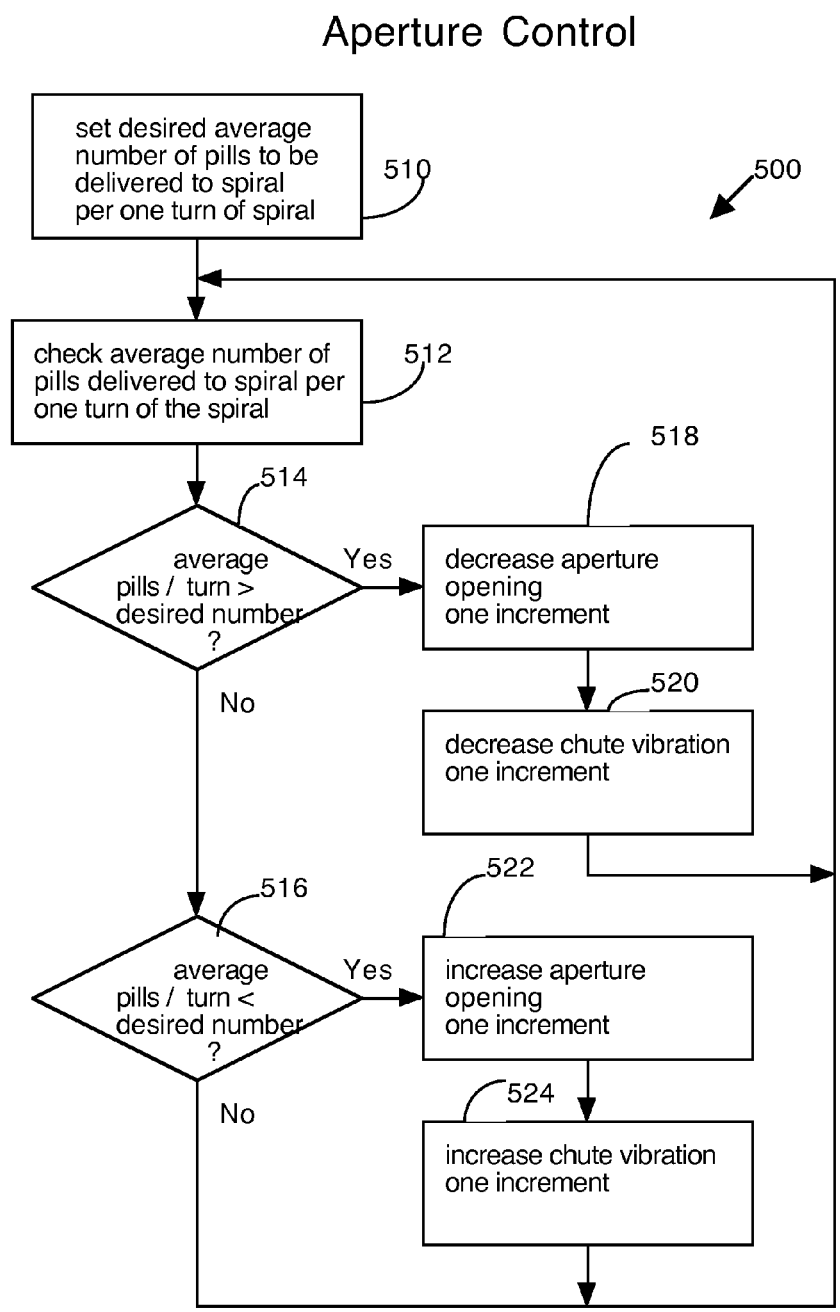
FIG. 15 is flow chart of aperture control operations.

Referring now to FIG. 15, a flow chart of aperture control operations is shown generally at reference numeral 500. The purpose of this process is to control the average number of pills delivered to transport tube 107 for each rotation thereof. This sets the flow rate of pills that will be presented to V-plate 109 after each rotation of transport tube 107. Vibration of V-plate 109 is great during the continuous, high-speed movement of pills before the number of pills already counted approaches the number required by the prescription. Thereafter, vibration of V-plate 109 decreases so that an extra pill is not presented to detector 170, 172.

The operator sets the desired average number of pills to be delivered for each rotation or turn of spiral transport tube 107 via transport tube drive 108, step 510. The system confirms the actual average number of pills equals that set by the operator, step 510. If the actual average number of pills per turn of spiral transport tube 107 is equal to or less than that set by the operator, step 514, the system progresses to step 516 to determine whether the actual average number of pills per turn of spiral transport tube 107 is, in fact, less than that set by the operator.

If, however, the actual average number of pills per turn of spiral transport tube 107 is greater than that set by the operator, step 514, the opening of aperture 105 is constricted or decreased by one increment, step 518, and the vibration of feed chute 103 via jog motor 118 or linear drive motor 242 and feed chute vibrator 104 is decreased, step 520. Control then returns to the system to check or confirm the actual average number of pills equals that set by the operator, step 510.

Similarly, if the actual average number of pills per turn of spiral transport tube 107 is, in fact, less than that set by the operator, step 516, the opening of aperture 105 is increased by one increment, step 522, and the vibration of feed chute 103 via jog motor 118 or linear drive motor 242 and feed chute vibrator 104 is increased, step 524. Control then returns to the system to check or confirm the actual average number of pills equals that set by the operator, step 510.

Figure 16:
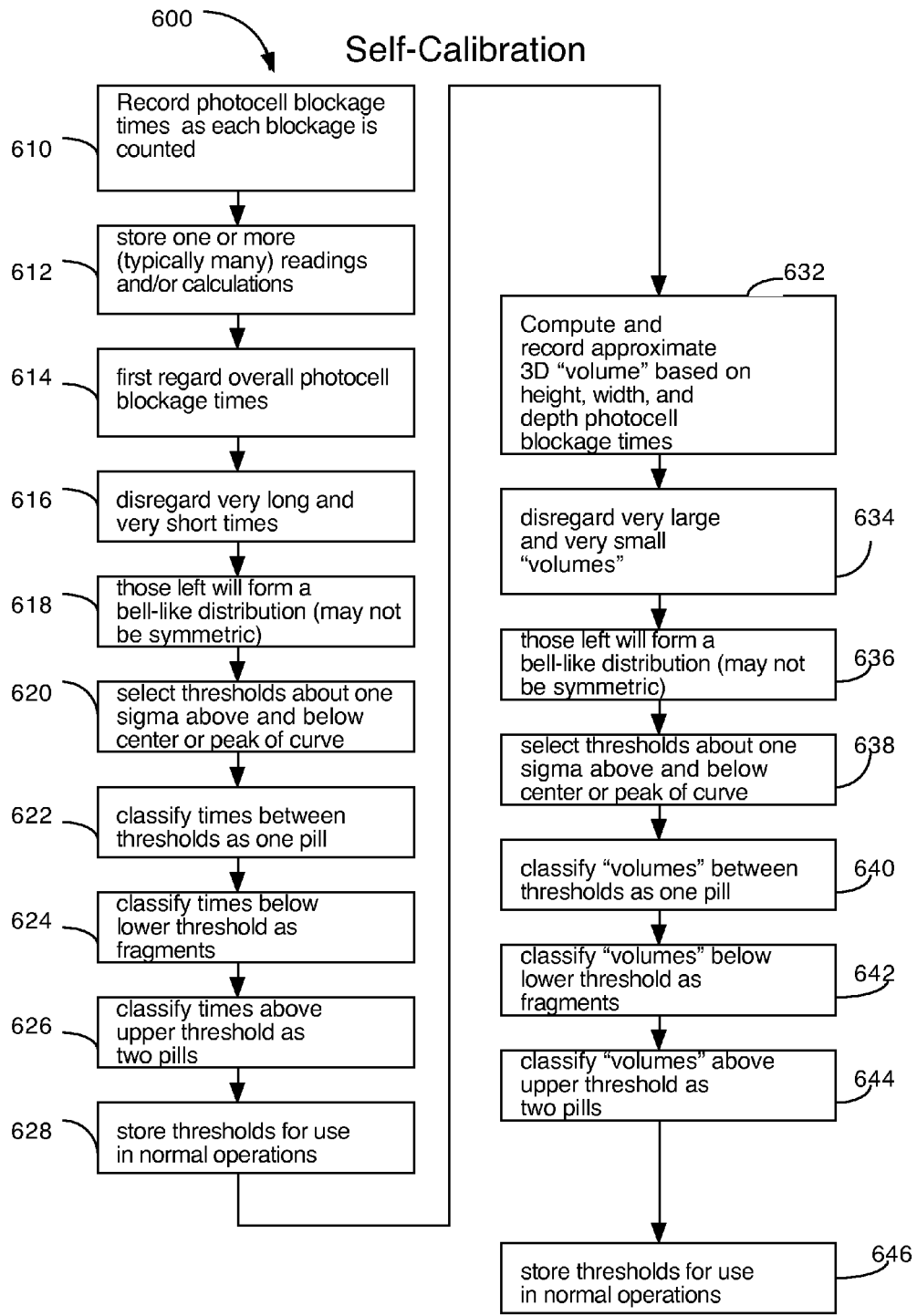
FIG. 16 is a flow chart of self-calibration for pill dispensing operations.

Referring now to FIG. 16, a flow chart of self-calibration for pill dispensing operations is shown generally at reference numeral 600.

Blockage times of photocell detectors 170, 172 are recorded for pills due to height, width, and depth as they are counted, step 610. At least one reading or calculation is then stored, step 612. Overall photocell blockage times are considered, step 614, but very long and very short blockage times are disregarded, step 616. The data that is analyzed forms a bell-like distribution, step 618.

Thresholds about one sigma above and one sigma below the center or peak of the curve are selected, step 620. Those times between thresholds are classified as a single pill, step 622; times below the lower threshold are classified as pill fragments, step 624; and times above the upper threshold are classified as two pills, step 626. The thresholds are stored for later use, step 628.

If the overall pulse width falls between the upper and lower thresholds, step 630, the volume for the pill is calculated, based on height, width, and depth determined by photocell blockage time, step 632. Once again very large and very small volumes are disregarded, step 634. As described above, the data that is analyzed forms a bell-like distribution, step 636. Thresholds about one sigma above and one sigma below the center or peak of the curve are selected, step 638. Those volumes between thresholds are classified as a single pill, step 640; volumes below the lower threshold are classified as pill fragments, step 642; and volumes above the upper threshold are classified as two pills, step 644. The thresholds are stored for later use, step 646.

Of course, if the overall pulse width does not fall between the upper and lower thresholds, step 630, the above-described analysis need not be performed and the thresholds are stored directly for later use, step 646.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for counting and dispensing pills, comprising:
   a) a housing;
   b) a hopper for containing a plurality of pills, said hopper being supported by said housing;
   b) a transport spiral for receiving pills from said hopper;
   c) a vibrating plate disposed proximate said transport spiral, said vibrating plate comprising means for adjusting the amplitude and frequency of vibration thereof to facilitate pill singulation, pill separation, and conveyance speed control;
   d) a drive mechanism connected to said vibrating plate for imparting vibration thereto; and
   e) a microcontroller operatively connected to said transport spiral and said vibrating plate drive mechanism for controlling operation thereof.

2. The apparatus for counting and dispensing pills in accordance with claim 1, wherein said drive mechanism for imparting vibration comprises means for abruptly stopping said vibration of said vibrating plate.

3. The apparatus for counting and dispensing pills in accordance with claim 1, wherein said hopper further comprises a hopper door release and a hopper door switch for allowing pills to be poured into said hopper.

4. The apparatus for counting and dispensing pills in accordance with claim 1, further comprising a vibrator to jog pills in said transport spiral, preventing said pills from jamming.

5. The apparatus for counting and dispensing pills in accordance with claim 1, wherein said vibrating plate comprises a rigid surface comprising at least one of the group: metal, plastic, and ceramic.

6. The apparatus for counting and dispensing pills in accordance with claim 1, wherein said vibrating plate further comprises a feedback mechanism for detecting the position, amplitude, and speed of said vibrating plate.

7. The apparatus for counting and dispensing pills in accordance with claim 6, wherein said feedback mechanism comprises a Hall Effect sensor.

8. The apparatus for counting and dispensing pills in accordance with claim 1, wherein said vibrating plate further comprises a flap door.

9. The apparatus for counting and dispensing pills in accordance with claim 1, wherein said vibrating plate further comprises a plurality of protrusions for preventing round pills from rolling uncontrollably and for preventing elongated pill from being conveyed one on top of another.

10. The apparatus for counting and dispensing pills in accordance with claim 1, further comprising means for forming a feedback control loop for said vibrating plate to maintain accurate control thereof.

11. A method for counting and dispensing pills, the steps comprising:
   a) providing a housing, a hopper for containing a plurality of pills, said hopper having a hopper door release and a hopper door switch, said hopper being supported by said housing, a transport spiral operatively connected to said hopper for receiving pills therefrom, said transport spiral having an outlet, a vibrating plate disposed proximate said outlet, said vibrating plate having a flap door connected thereto, a drive mechanism connected to said vibrating plate for imparting vibration thereto, and a feedback control loop for said vibrating plate to maintain accurate control thereof; and
   b) activating said hopper door release and said hopper door switch to allow pills to be poured into said hopper.

12. The apparatus for counting and dispensing pills in accordance with claim 11, wherein said drive mechanism for imparting vibration comprises means for abruptly stopping said vibration of said vibrating plate.

13. The method for counting and dispensing pills in accordance with claim 11, the steps further comprising electrically connecting a microcontroller to said hopper, said transport spiral, and said drive mechanism.

14. The method for counting and dispensing pills in accordance with claim 11, wherein said transport spiral further comprises a vibrator.

15. The method for counting and dispensing pills in accordance with claim 14, the steps further comprising imparting vibration to said transport spiral vibrator to jog pills therein, preventing said pills from jamming.

16. The method for counting and dispensing pills in accordance with claim 11, the steps further comprising providing a feedback device operatively connected to said vibrating plate for detecting the position and speed thereof.

17. The method for counting and dispensing pills in accordance with claim 16, wherein said feedback device comprises a Hall Effect sensor.

18. The method for counting and dispensing pills in accordance with claim 11, the steps further comprising adjusting the amplitude and frequency of vibration of said vibrating plate to facilitate pill singulation, pill separation, and conveyance speed control.

* * * * *